(12) United States Patent
Kamm et al.

(10) Patent No.: US 12,480,079 B2
(45) Date of Patent: Nov. 25, 2025

(54) FLUIDIC PLATFORMS FOR PERFUSABLE VASCULARIZED TISSUES WITH INFILTRATES

(71) Applicant: Massachusetts Institute of Technology, Cambridge, MA (US)

(72) Inventors: Roger Kamm, Cambridge, MA (US); Huu Tuan Nguyen, Cambridge, MA (US); Sharon Wei Ling Lee, Cambridge, MA (US)

(73) Assignee: MASSACHUSETTS INSTITUTE OF TECHNOLOGY, Cambridge, MA (US)

(*) Notice: Subject to any disclaimer, the term of this patent is extended or adjusted under 35 U.S.C. 154(b) by 641 days.

(21) Appl. No.: 17/678,729

(22) Filed: Feb. 23, 2022

(65) Prior Publication Data

US 2023/0146860 A1     May 11, 2023

Related U.S. Application Data

(60) Provisional application No. 63/179,006, filed on Apr. 23, 2021.

(51) Int. Cl.
*C12M 3/00*     (2006.01)
*A01N 1/02*     (2006.01)
(Continued)

(52) U.S. Cl.
CPC ............ *C12M 21/08* (2013.01); *A01N 1/125* (2025.01); *A01N 1/162* (2025.01); *C12M 23/16* (2013.01);
(Continued)

(58) Field of Classification Search
None
See application file for complete search history.

(56) References Cited

U.S. PATENT DOCUMENTS 9,261,496 B2   2/2016   Kamm
10,017,724 B2*   7/2018   Nikkhah ................ C12M 23/16
(Continued)

FOREIGN PATENT DOCUMENTS

WO   2017070542   4/2017
WO   2017155399   9/2017
WO   2019200034   10/2019

OTHER PUBLICATIONS

Cui, et al. "Dissecting the Immunosuppressive Tumor Microenvironments in Glioblastoma-on-a-Chip for Optimized Pd-1 Immunotherapy" (2020).
(Continued)

*Primary Examiner* — Michael A Marcheschi
*Assistant Examiner* — Ashley Lopezlira
(74) *Attorney, Agent, or Firm* — Pabst Patent Group LLP

(57) ABSTRACT

Microfluidic devices with open ports and gel channels for forming perfusable hydrogel vascular networks with holes or ports for samples, and methods of making and using, are provided which integrate interstitial flows to an ex vivo vascularized tissue model. Samples of cells, spheroids, organoids, and tissues can be used for screening of agents for efficacy, toxicity and dosage. The devices create interstitial flow from the top of the gel hole, through the sample toward the vascular networks, and/or luminal flows generated by a pressure difference between two media channels across the vascular network. This system is useful for studying angiogenesis, immune cell migration and testing new immunotherapy drug candidates.

26 Claims, 22 Drawing Sheets

(51) Int. Cl.
| | |
|---|---|
| A01N 1/125 | (2025.01) |
| A01N 1/162 | (2025.01) |
| C12M 1/12 | (2006.01) |
| C12M 3/06 | (2006.01) |
| C12N 5/071 | (2010.01) |

(52) U.S. Cl.
CPC ........... *C12M 25/04* (2013.01); *C12N 5/0691* (2013.01); *C12N 5/0697* (2013.01); *C12N 2513/00* (2013.01); *C12N 2533/56* (2013.01)

(56) References Cited

U.S. PATENT DOCUMENTS

| | | | | |
|---|---|---|---|---|
| 2012/0095442 | A1* | 4/2012 | Dormer | A61K 9/0009 604/507 |
| 2017/0355945 | A1 | 12/2017 | Kamm | |
| 2018/0327701 | A1 | 11/2018 | Fernandez Ledesma | |
| 2020/0063081 | A1 | 2/2020 | Vulto | |
| 2020/0385659 | A1* | 12/2020 | Gobaa | C12M 29/10 |

OTHER PUBLICATIONS

Hachey, et al. "An in Vitro Vascularized Micro-Tumor Model of Human Colorectal Cancer Recapitulates in Vivo Responses to Standard-of-Care Therapy." Lab on a Chip, 21:1333-51 (2021).
Ko, et al., "Tumor Spheroid-on-a-Chip: A Standardized Microfluidic Culture Platform for Investigating Tumor Angiogenesis." Lab on a Chip, 19:2822-33 (2019).
Saha, et al. "Human Tumor Microenvironment Chip Evaluates the Consequences of Platelet Extravasation and Combinatorial Antitumor-Antiplatelet Therapy in Ovarian Cancer." Science Advances, 7:eabg5283 (2021).
Straehla, et al. "A Predictive Microfluidic Model of Human Glioblastoma to Assess Trafficking of Blood-Brain Barrier-Penetrant Nanoparticles." Proceedings of the National Academy of Sciences, 119 (2022).
Ayuso, J. M., et al., "Evaluating natural killer cell cytotoxicity against solid tumors using a microfluidic model", Oncoimmunology; 8(3) (2019).
Bai, J., et al., "A novel 3D vascular assay for evaluating angiogenesis across porous membranes", Biomaterials, 268: 120592 (2021).
Benninger R. & Piston, D., "Two-Photon Excitation Microscopy for the Study of Living Cells and Tissues", Curr Protoc Cell Biol.; 4.1124 (2013).
Bhatia, S. N., & Ingber, D. E., "Microfluidic organs-on-chips", Nat. Biotechnol., 32: 760-772 (2014).
Boussommier-Calleja, A., et al., "The effects of monocytes on tumor cell extravasation in a 3D vascularized microfluidic model", Biomaterials; 198: 180-193 (2019).
Campisi, M., et al., "3D self-organized microvascular model of the human blood-brain barrier with endothelial cells, pericytes and astrocytes", Biomaterials; 180: 117-129 (2018).
Chen, M. B., et al., "Mechanisms of tumor cell extravasation in an in vitro microvascular network platform.", Integr Biol Quant Biosci from Nano to Macro, 5(10): 1262-1271 (2013).

Chen, M. B., et al., "On-chip human microvasculature assay for visualization and quantification of tumor cell extravasation dynamics" Nat Protoc.;12(5): 865-80 (2017).
Coughlin, M. F. & Kamm, R. D., "The Use of Microfluidic Platforms to Probe the Mechanism of Cancer Cell Extravasation", Adv Healthc Mater. 9(8):1901410 (2020).
Haase, K., et al., "Endothelial Regulation of Drug Transport in a 3D Vascularized Tumor Model", Adv Funct Mater. 30(48): 2002444 (2020).
Hajal, C., et al., "Engineered human blood-brain barrier microfluidic model for vascular permeability analyses", Nature Protocols, 17: 95-128 (2022).
Kramer, B., et al., "Interstitial Flow Recapitulates Gemcitabine Chemoresistance in A 3D Microfluidic Pancreatic Ductal Adenocarcinoma Model by Induction of Multidrug Resistance Proteins", Int. J. Mol. Sci., 20: 4647 (2019).
Lee, S.W. L., et al., "Characterizing the Role of Monocytes in T Cell Cancer Immunotherapy Using a 3D Microfluidic Model", Front Immunol. 9: 416 (2018).
Nashimoto, Y., et al., "Integrating perfusable vascular networks with a three-dimensional tissue in a microfluidic device", Integrative Biology, 9(6): 506-518 (2017).
Nashimoto, Y., et al., "Vascularized cancer on a chip: The effect of perfusion on growth and drug delivery of tumor spheroid", Biomaterials.; 229: 119547 (2020).
Offeddu, G. S., et al., "An on-chip model of protein paracellular and transcellular permeability in the microcirculation", Biomaterials, 212: 115-125 (2019).
Offeddu, G. S., et al., "Application of Transmural Flow Across In Vitro Microvasculature Enables Direct Sampling Of Interstitial Therapeutic Molecule Distribution", Small, 15(46): 1902393 (2019).
Osaki, T., et al., "Vascularized microfluidic organ-chips for drug screening, disease models and tissue engineering", Curr. Opin. Biotechnol., 52: 116-123 (2018).
Paek, J., et al., "Microphysiological Engineering of Self-Assembled and Perfusable Microvascular Beds for the Production of Vascularized Three-Dimensional Human Microtissues", ACS Nano, 13(7): 7627-43 (2019).
Phan, D., et al., "Blood-brain barrier-on-a-chip: Microphysiological systems that capture the complexity of the blood-central nervous system interface", Experimental Biology and Medicine, 17(3): 511-520 (2017).
Philipp. K., et al., "Diffraction-limited axial scanning in thick biological tissue with an aberration-correcting adaptive lens", Sci. Rep., 9: 9532 (2019).
Shelton, S. E., et al. Engineering approaches for studying immune-tumor cell interactions and immunotherapy, iScience, 24 (1), 101985 (2021).
Wang, X., et al., "Microfluidic-Based 3D Engineered Microvascular Networks and Their Applications in Vascularized Microtumor Models", Micromachines, 9(10): 493 (2018).
Zervantonakis, I.K,, et al., "Three-dimensional microfluidic model for tumor cell intravasation and endothelial barrier function", Proc Natl Acad Sci U S A,. 109(34): 13515-13520 (2012).
Jain, Rakeshk. , "Molecular regulation of vessel maturation", Nat Med., vol. 9, No. 6, Jun. 2003, pp. 685-693.

* cited by examiner

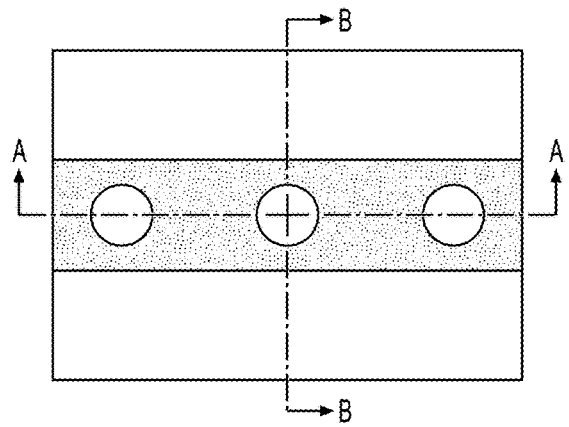
Fig. 5A
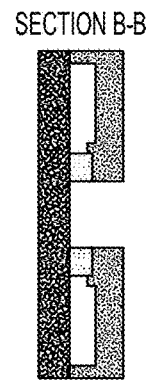
Fig. 5C
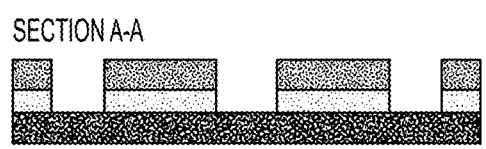
Fig. 5B
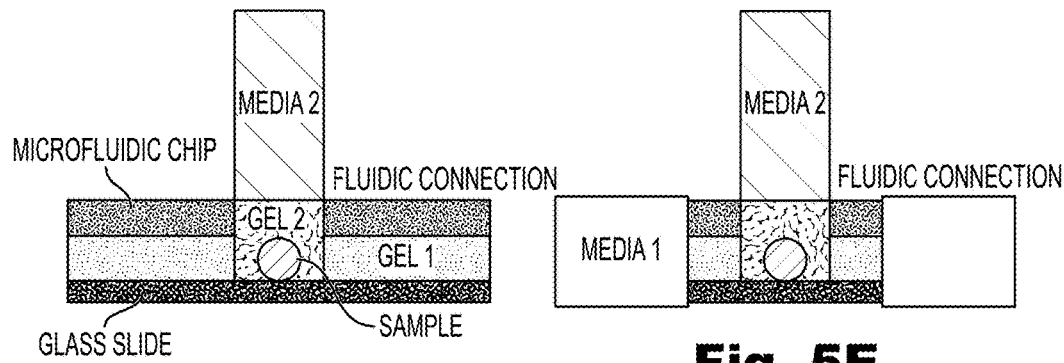
Fig. 5D
Fig. 5E
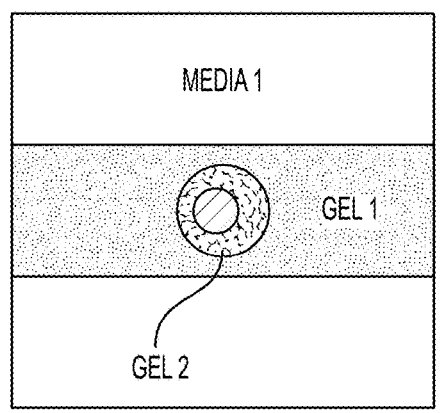
Fig. 5F

□ HUVEC  ■ MDA-MB 468  ▨ BLUE DEXTRAN

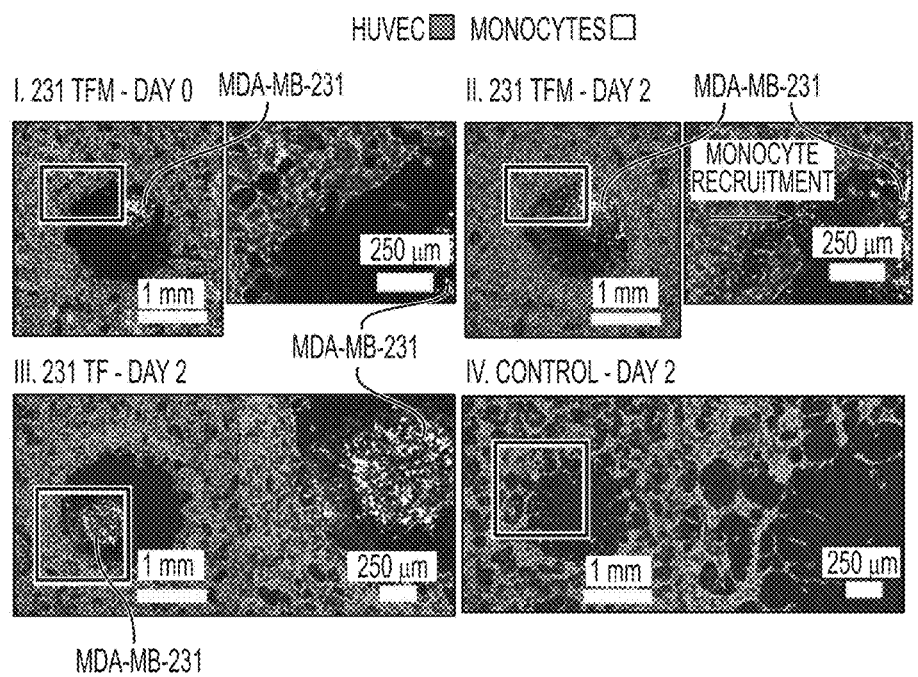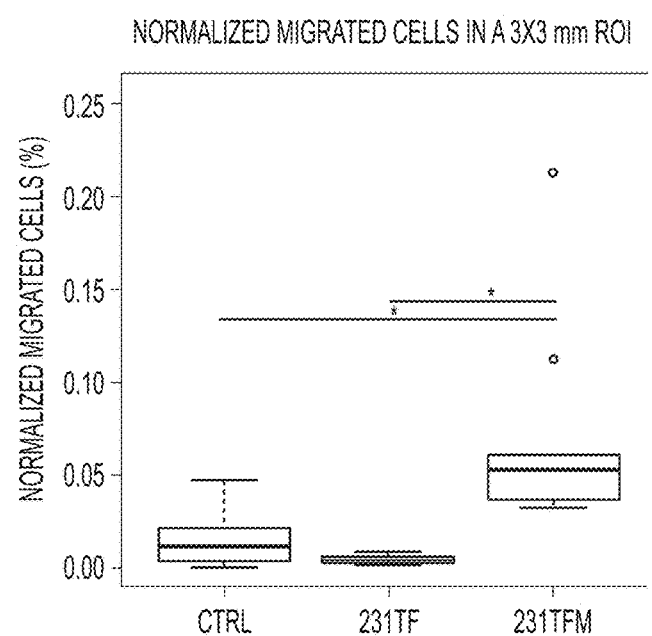

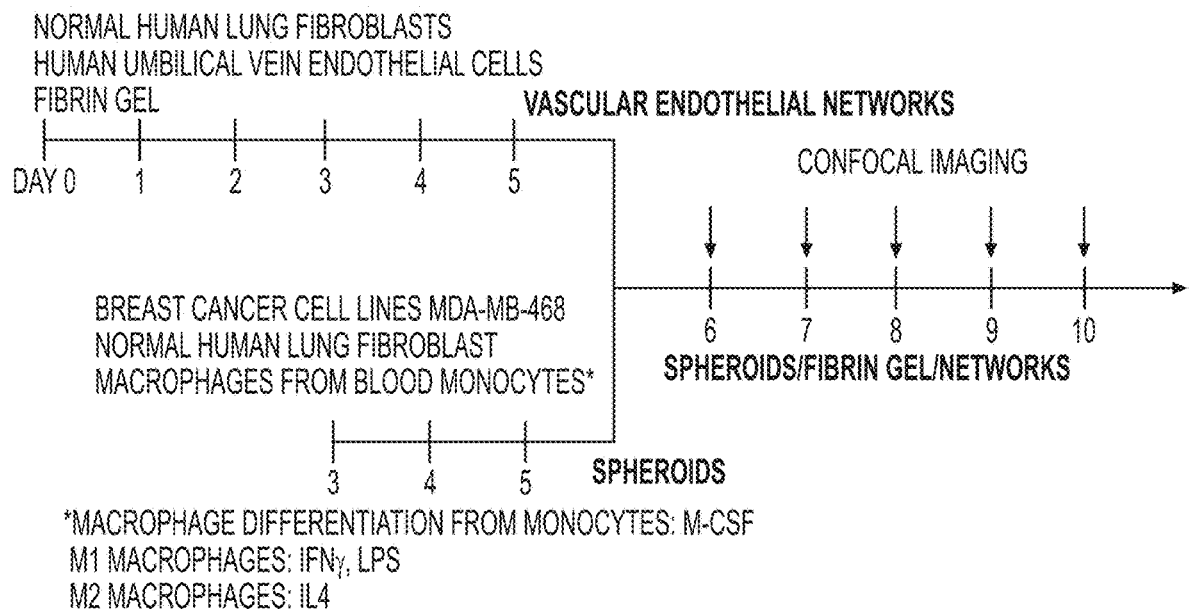
*FIG. 7A*
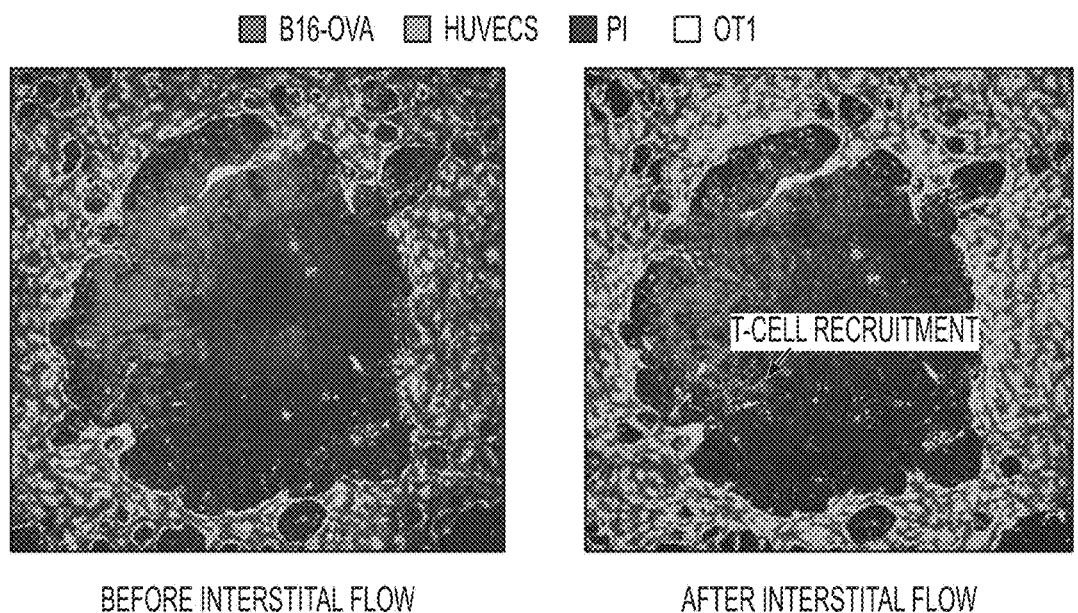
BEFORE INTERSTITAL FLOW
*FIG. 7B*
AFTER INTERSTITAL FLOW
*FIG. 7C*

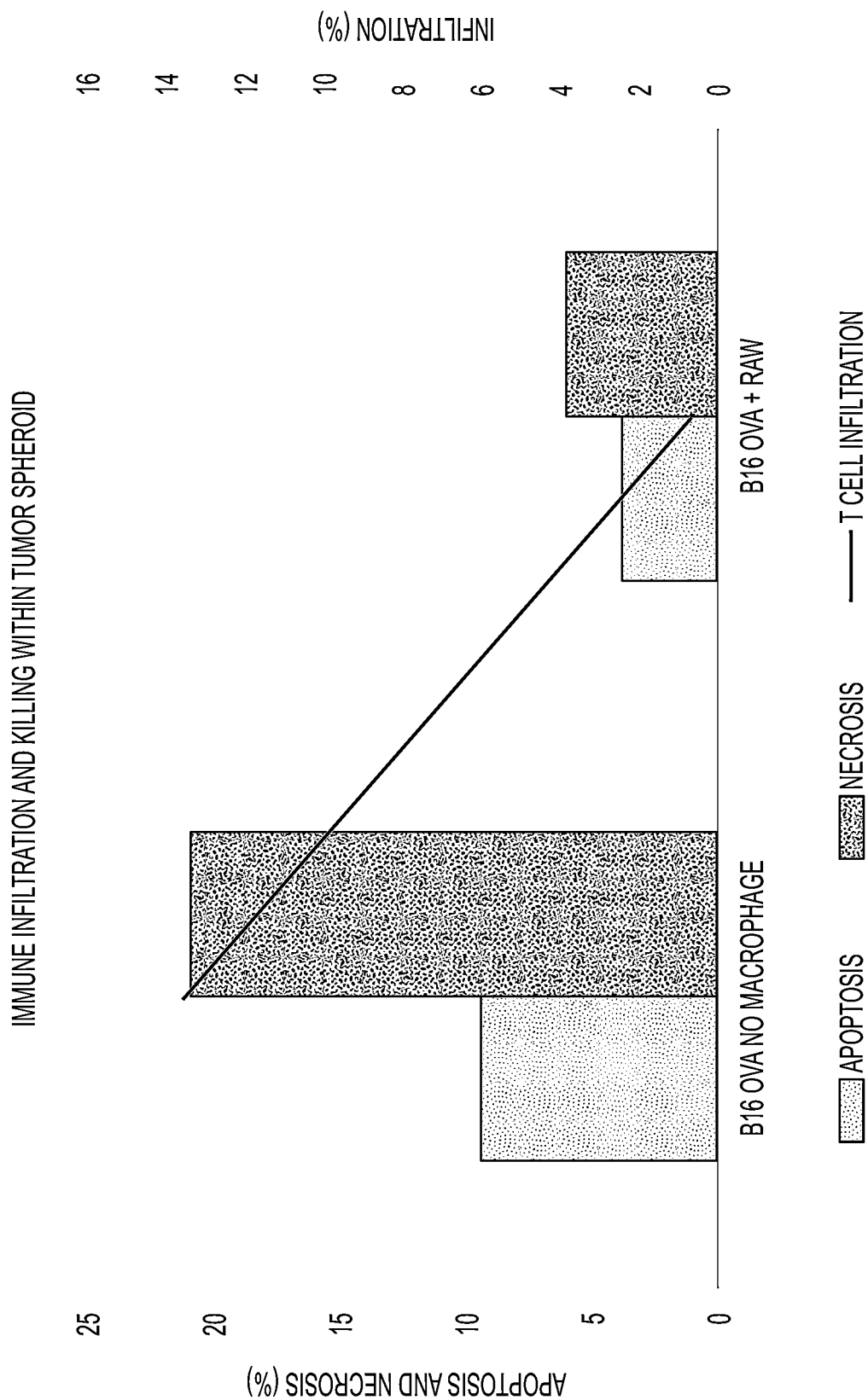

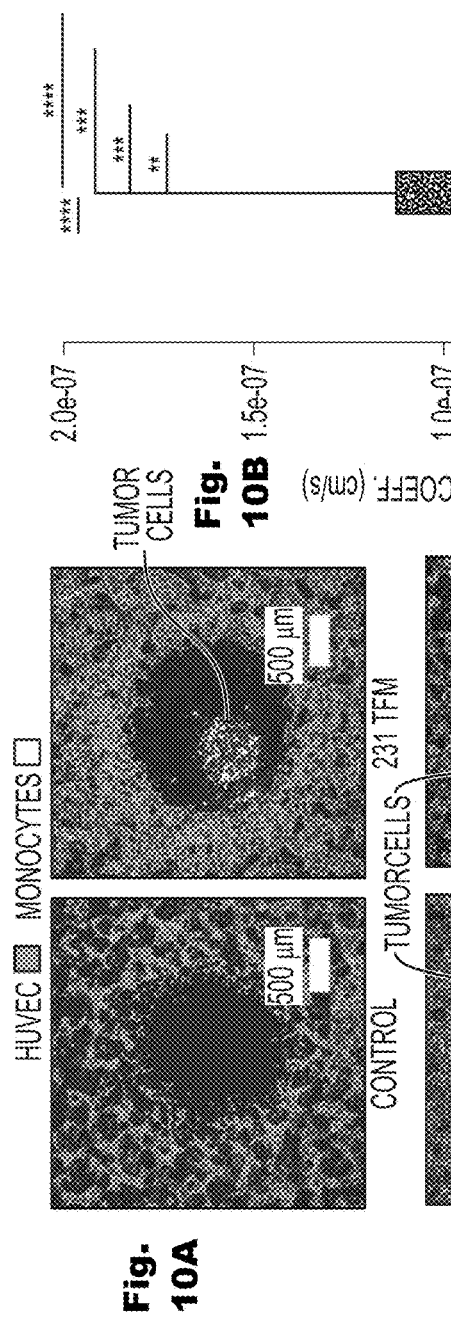
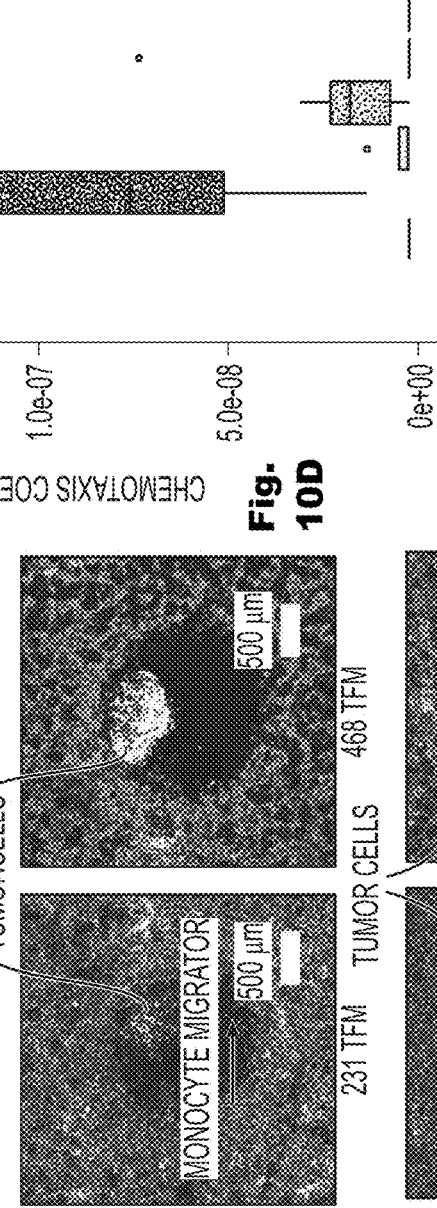
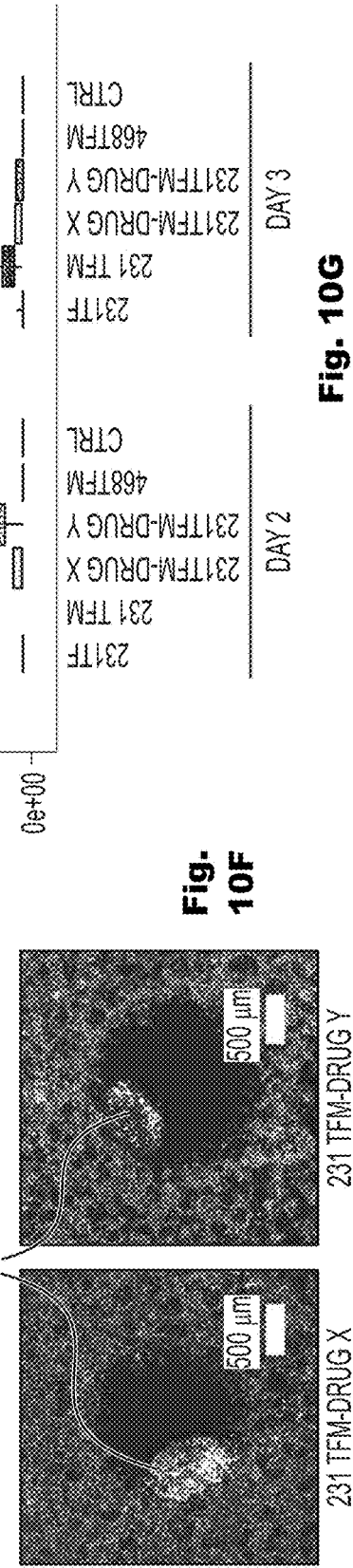

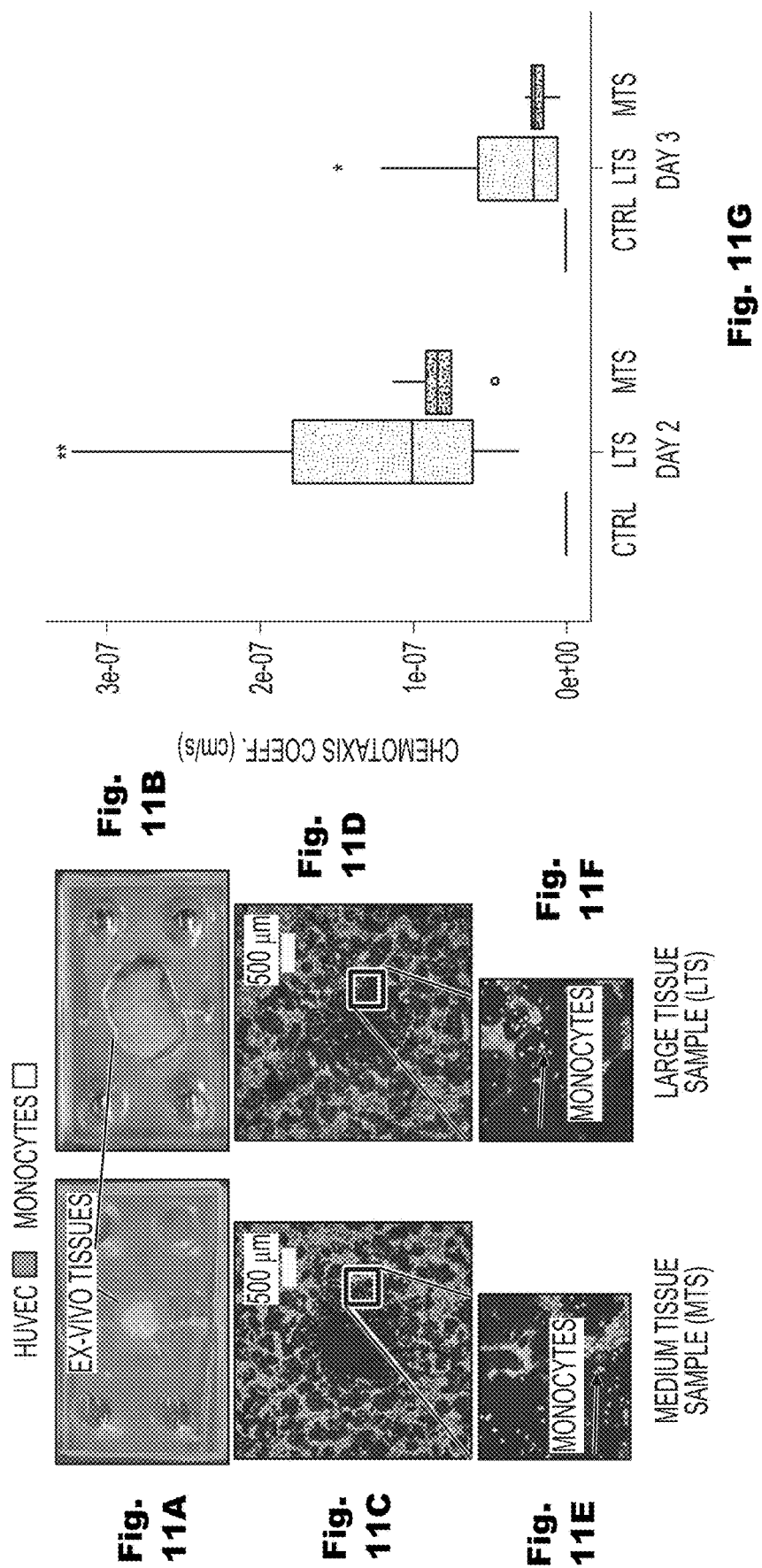

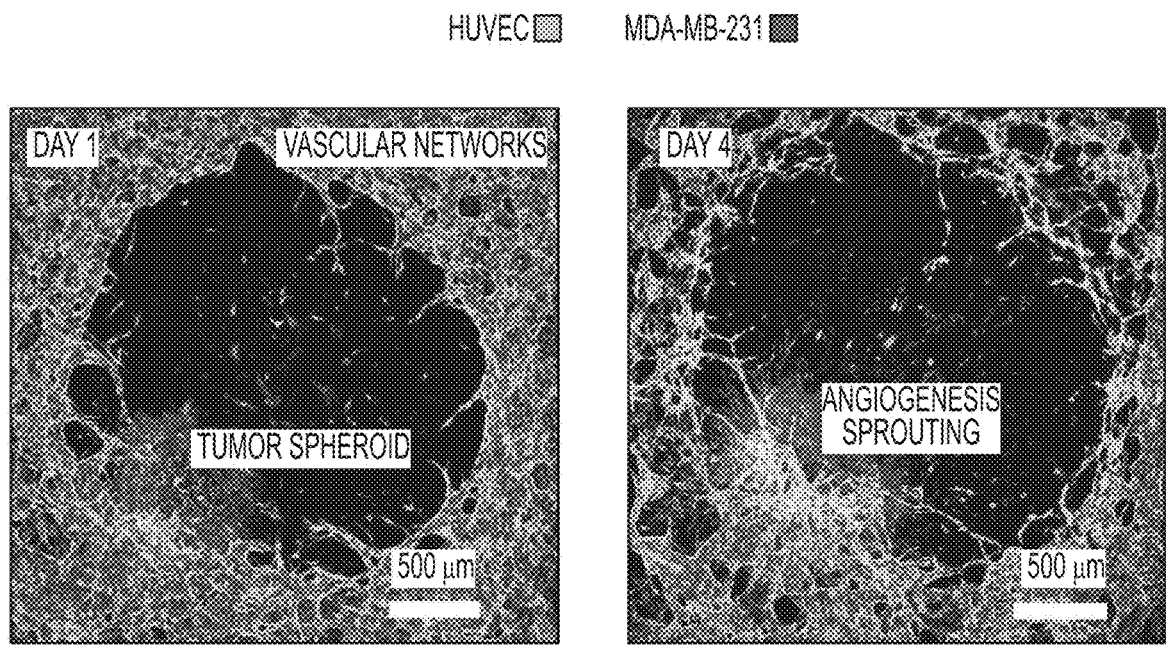
Fig. 12A  Fig. 12B
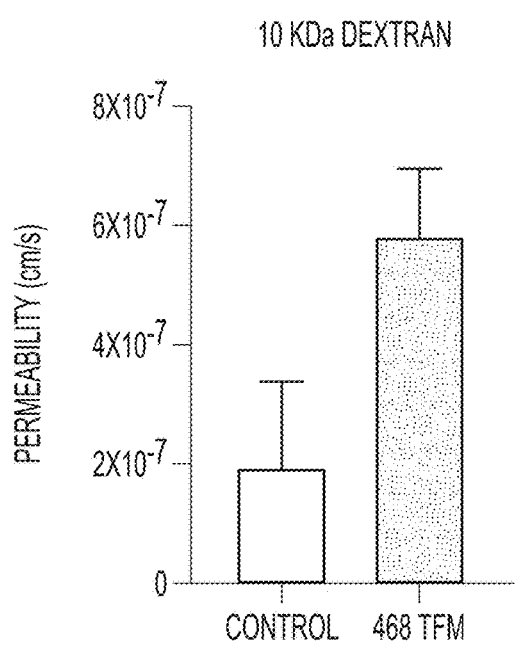
FIG. 13A
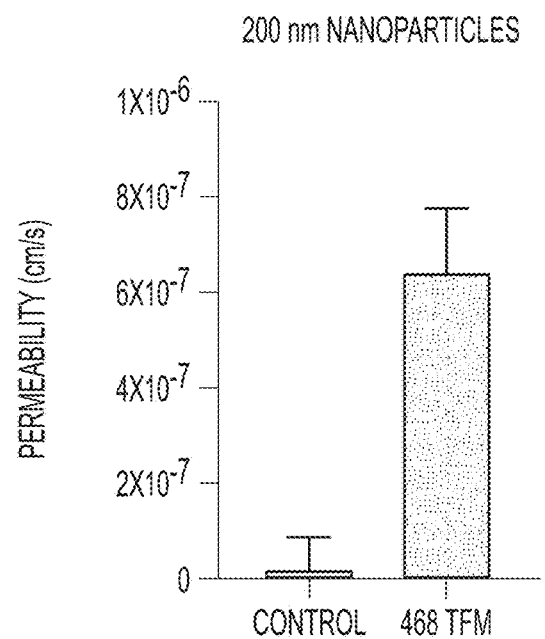
FIG. 13B

FLUIDIC PLATFORMS FOR PERFUSABLE VASCULARIZED TISSUES WITH INFILTRATES

CROSS-REFERENCE TO RELATED APPLICATIONS

This application claims the benefit of and priority to U.S. Provisional Application No. 63/179,006 filed Apr. 23, 2021, which is hereby incorporated by reference in its entirety.

STATEMENT REGARDING FEDERALLY SPONSORED RESEARCH

This invention was made with Government support under Grant No. U01 CA214381 awarded by the National Institutes of Health (NIH). The Government has certain rights in the invention.

FIELD OF THE INVENTION

This invention is generally directed to microfluidic devices supporting tissue perfusion and vascularization.

BACKGROUND OF THE INVENTION

Microvasculature has unique biological functions and physical properties, such as maintaining solute and water balance between the blood and tissue compartments, and responding to different deformations and stress fluctuations (Jain et a., *Nat. Med.,* 9:685-693 (2003)). Recently, the concept of "organ-on-a-chip" has been proposed to establish in vitro models that can mimic the microphysiological function and three-dimensional (3D) microstructure of human organs more accurately and specifically compared to the traditional two-dimensional (2D) cultures and animal models (Bhatia et al., *Nat. Biotechnol.,* 32:760-772 (2014)). In addition to supplying nutrient and oxygen to the cultured tissue by perfusing the culture medium, vascularization of an organ-on-a-chip can also contribute to the establishment of organ-specific microenvironments and microphysiological function by constructing the microvascular with selective barrier function similar to that in vivo. In other words, to better mimic the characteristics and functions of specific human organs in vitro, there is a need for a perfusable and functional 3D microvasculature applicable to different organ-on-a-chip systems (Wang et al., Micromachines, 9, 493:1-26 (2018)).

Microfluidic technologies have emerged as useful tools for the development of organs-on-a-chip, which can help control various aspects of the cellular microenvironment such as a different profile of fluid flow, gradient of various growth factors, and mechanical properties of versatile biomaterials.

"Organ-on-a-chip" models enable the development of 3D cultures of different cell types and allow detailed characterization of critical biological interactions (Boussommier-Calleja et al., *Trends in Cancer.;*2(1):6-19 (2016), Sontheimer-Phelps, et al., *Nat Rev Cancer:*19:65-81 (2019)). These microfluidic chips have the capability to recapitulate a perfusable vascular network and deliver signaling molecules and immune cells using microfluidic flow (Chen et al., *Nat Protoc.;*12(5):865-80 (2017)).

Spheroids are created by culturing human cells in 3D on a low adhesion well plate or in a gel. Organoids are cells in 3D culture that are derived from a tissue, embryonic stem cells or induced pluripotent stem cells. Animal and patient-derived organoids are typically ex vivo tissues that are obtained by dissection and surgery, respectively. Compared to 2D cell culture, spheroids, organoids, and ex vivo tissues are better representations of the structure of an organ where each cell is in contact with other cells and incorporated into the extracellular matrix. Integrating 3D structures such as spheroids, organoids, or ex vivo tissues into microfluidic systems not only recapitulates the physiological state of the cells within a body but also allows interactions between cells in a tissue and peripheral cells or circulating immune cells (Shelton et al. iScience. 24 (1), 101985 (2021)).

Vasculature-on-a-chip models are used to study the mechanism and interactions between different cells and the vasculature (Boussommier-Calleja et al., *Biomaterials;* 198: 180-93 (2019)), drug transport, disease modeling, or cancer metastasis (Chen et al., *Nat Protoc.;*12(5):865-80 (2017)). Vasculatures have been created using a predefined hollow gel wall coated with endothelial cells (Ayuso et al., *Oncoimmunology;* 8(3) (2019)), angiogenesis of endothelial cells grown as a monolayer, or vasculogenesis of endothelial cells suspended in a gel (Chen et al., *Integr Biol* Quant Biosci from Nano to Macro;5(10):1262-71 (2013), Campisi et al., *Biomaterials;* 180:117-29 (2018)). In order to study cell-vasculature interactions, it is important to have perfusable vascular networks to mimic physiological interactions within the vasculature. Several groups have created different perfusable vascular network models. Integration of tumor spheroids and organoids within vascular networks adds to the physiological complexity of a system and allows for an environment that mimics the interaction between an organ or tumor and the vasculature. In particular, vasculature structures, based on the angiogenesis of an endothelial monolayer, have been formed before grafting a tumor spheroid from the top (Nashimoto et al., *Biomaterials.;* 229:119547 (2020)).

However, due to the formation of the networks based on angiogenesis, the networks do not mimic a degree of perfusability that is comparable to in vivo measurements. A vasculature bed concept in which a perfusable vasculature network is placed within an open-top and used for multiple drug screening applications was also developed (Paek et al., *ACS Nano;* 13(7):7627-43 (2019)). This vasculature bed is created simultaneously with spheroid formation and cannot decouple the interaction between fully formed networks and tumor spheroids. Moreover, these methods are based on either seeding spheroids and endothelial cells together or placing spheroids/organoids on top of a formed microfluidic vascular bed. In the first case, endothelial cells form self-assembled vascular networks with the presence of spheroids or organoids or ex vivo tissues, which affect the network's morphology, density, and connectivity. For example, thick tissues isolated from a patient can compete for nutrients with endothelial cells that are forming vasculatures. Insertion of tissue samples into a fully-formed microvasculature bed ensures the viability of freshly-isolated tissues or time-sensitive spheroid/organoid samples. As the vascular network is functional and perfusable at the time the samples are inserted, nutrients can be delivered to the tissue samples through flows inside the vasculatures. In the current state-of-the-art, inserting samples is by adding spheroids/organoids/tissue samples onto the top of a vasculature bed within an open-top microfluidic device (Vulto et al, US 2020/0063081 A1 (2018), Paek et al., *ACS Nano;* 13(7):7627-43 (2019)). Therefore, any transport of cells or molecules from vasculatures to spheroids/organoids happens in the vertical direction and useful imaging area at the interface between the vasculature and spheroids/organoids situates at the top of the vascular bed that has a typical thickness between 100-1000 µm (Chen et al., *Nat Protoc.;*12(5):865-80 (2017), Paek et al., *ACS Nano;* 13(7):7627-43 (2019), Campisi et al., *Biomaterials;* 180:117-29 (2018)). These constraints make imaging and quantifying these transportation phenomena in high-resolution inside the added spheroids/organoids of the typical thickness of 40 µm-1 mm more difficult (Nashimoto et al., *Biomaterials.;* 229:119547 (2020)). This is due to the limitation of light penetration, diffraction of light within the vascular bed and the working distance of the objective lens (Benninger et al., *Curr Protoc Cell Biol.;* 4.11.24 (2013)). Currently, the typical live sample thickness that can be imaged by a conventional confocal scanning microscope is under 340 µm (Philipp. et al., *Sci Rep* 9, 9532 (2019)). Even two-photon excitation microscopy can only reach approximately 370 µm depth in dense tissues such as epithelial tissues (Benninger et al., *Curr Protoc Cell Biol.;* 4.11.24 (2013). Moreover, the transport of cells in the vertical axis is also affected by gravity force. Therefore, a system that allows cell and molecule transportation from/to vasculatures to/from inserted tissues in the lateral direction within the diffraction-limited imaging depth is required.

There is great potential to model pathological conditions to study vascular-related diseases and cancer, including diseases with substantial immune cell infiltrates. Especially for cancer biology, the tumor vasculature plays a critical role in several key events in the metastatic cascade, such as intravasation and extravasation. Engineered microvessels are well suited to the study of mechanisms of tumor growth and metastasis, drug screening, and cancer therapies by establishing the vascularized microtumor models in vitro (Wang et al., *Micromachines,* 9, 493:1-26 (2018)). Compared to other methods that create vasculature models in vitro such as bioprinting, coating of hollow structures, self-assembly of endothelial cells inside hydrogels can achieve typical microvasculature dimension of 5-30 µm diameter, with a tight junction and high vascular density (Chen et al., *Nat Protoc.;*12(5):865-80 (2017)). However, platforms for forming such vascularized tissue models in vitro, and providing tissues interconnected by the vascular networks and capable of receiving both grafted tissues and infiltrates, are not well developed.

Immunotherapies constitute an expanding therapeutic armamentarium against various diseases, including cancer and viral infection. Due to the complex mechanism of immunotherapy, and oftentimes, their lack of cross-reactivity to murine counterparts of their intended targets, drug testing using animal models or conventional 2D human cell cultures are not sufficient to predict patient drug efficacy. Many in vitro models do not model both immune cell extravasation and chemotaxis migration steps (Paek et al., *ACS Nano;* 13(7):7627-43 (2019), Ayuso et al., *Oncoimmunology;* 8(3) (2019)). There remains a need for human-cell-based platforms supporting testing of the effect of human-cell-specific antibody on immune cell recruitment by a tumor spheroid or ex vivo tissues from vascular networks and subsequent tumor cell killing by effector cells, as well as for platforms supporting formation and culture of perfusable vascularized tissues with infiltrates biomimicking in vitro vascularized microtissue models.

Therefore, it is an object of the present invention to provide microfluidic platforms for forming and culturing perfusable pre-vascularized tissues with infiltrates.

It is another object of the present invention to provide microfluidic platforms with pre-vascularized beds and an empty well for easy, timely integration of cells, spheroids, organoids, and ex vivo tissues (inserted samples).

It is another object of the present invention to provide methods of forming microfluidic platforms for perfusable vascularized tissues with empty compartments for tissue graft and infiltrates.

It is yet another object of the present invention to provide methods of using microfluidic platforms for perfusable vascularized tissues with infiltrates.

It is another object of the present invention to provide microfluidic platforms having perfusable vascularized tissues with infiltrates for imaging of infiltrate transportation from vasculatures to the grafted tissues and immunotherapy drug screening.

SUMMARY OF THE INVENTION

Microfluidic devices for forming perfusable vascularized tissues with one or more empty wells and infiltrates typically include at least three adjacent and parallel microchannels, wherein a central microchannel is typically a gel channel having cells forming microvascular networks and a central port therein for the introduction of organoids/spheroids/tissues, and the two adjacent microchannels are media channels. The gel channel includes a first end and a second end and is separated from the media channels by phase guides. The devices also include one or more ports positioned on a top surface of the gel channel and at a distance away from the first end and the second end of the gel channel.

The one or more ports are positioned in the top surface of the gel channel and, in one embodiment, at about the center of the gel channel. The one or more ports may be positioned in the top surface of the gel channel and at a distance between about 1 mm and about 20 mm away from the first end and the second end.

In some embodiments, the gel channel includes one port. In some embodiments, the gel channel includes more than one port.

The microfluidic devices are filled with a gel solution containing cells and/or one or more extracellular matrix (ECM) components. The cells may be endothelial cells, stromal cells, smooth muscle cells, pericytes, fibroblasts, progenitor cells, or combinations thereof. Exemplary ECM components include fibrous proteins such as collagen, fibrin, fibronectin, elastins, and laminin; hyaluronic acid; and proteoglycans. These cells form a vascularized network within the gel. Oxygenated culture media is passed through one of the adjacent media channels, so that the fluid and oxygen pass through the gel to nourish and maintain the vascular network, and into the second media channel.

The method of filling the devices with the gel solution includes forming holes within the gel solution below one or more ports of the device. After filling the gel channel with the gel solution, allowing it to gel, forming holes in the gel, and culturing, the gel channel typically includes a perfusable vascular network with one or more holes, each hole positioned below one of the one or more ports. The formation of the hole surrounded by fully-formed microvasculatures is an important difference compared to previous in vitro tissue models.

One or more microfluidic devices may form microfluidic platforms with fluidic connections to fluid supply reservoirs. Typically, each device has a fluidic connection to the fluid supply reservoir via the gel channel port and via the media.

Also described are methods for forming perfusable vascular networks with holes positioned in the gel channel of the microfluidic device and methods of forming perfusable tissue masses with infiltrates. The method typically includes depositing one or more cells, spheroids, organoids, ex vivo tissues, or mixes of cells in the one or more holes of the perfusable vascular network positioned on the top of the gel channel of the microfluidic device and culture for a period of time. Typically, the deposited cells are cultured in the devices with a perfusable vascular network for between about 2 days and 10 days. During culture, cells can be supplied through the media channels, then typically infiltrate into the deposited tissue masses in the gel channel to form perfusable tissue masses with infiltrates. These methods are also useful in forming vascularized human tumors for immunotherapy drug screening. The devices with perfusable vascular networks and open-top ports typically generate fluid flow which passes through the implanted cells or tissue toward the vasculature, mimicking the interstitial flow of tissue microenvironments.

Two types of flow can be generated within the devices: (1) interstitial flows from the top of the gel hole, through the implanted cells, spheroids, or organoids (the "sample") toward the vascular networks, and (2) luminal flows generated by a pressure difference between two media channels across the vascular network. Interstitial flow integration is key for the recruitment of immune cells into the organoid or spheroid. Perfusable vascularized tissue masses can include infiltrates of at least three categories: (1) infiltrated cells that extravasate and migrate toward the tissue masses and enter the tissue masses; (2) cells that extravasate but do not move toward the tissue masses; and (3) cells that stay luminal.

The devices are useful for studying molecular and cell transports from vasculatures to tissues and vice-versa, the effects and/or effective dosage of therapeutic, prophylactic, and/or diagnostic agents, for assessing an immunological role or effect on vascular structures, and for characterizing cellular interactions between the sample and the vascular network. The agent(s)e can be applied directly to the sample or vascular network through the entry/sample port in the gel channel. The transport of the agents is characterized by real-time imaging of the tissues and used to compute pharmacokinetic parameters. The effects of the agents can be assessed visually through the entry/sample port, by detecting and/or measuring cell viability, phenotype, cell migration or cell composition, cellular function (such as contraction of heart cells or production of insulin by islet cells) or changes in gene expression or products produced by the cells in response to the agent, or by other means of quantitating cells or cellular products or changes therein over time as a function of the agent. For example, angiogenesis can be assessed by looking at the proliferation or ingrowth of vascular cells from the vasculature into the sample and toxicity can be assessed by a decrease in cell number.

BRIEF DESCRIPTION OF THE DRAWINGS

FIG. 1A shows a side view of the gel channel during gel loading, FIG. 1B shows a top view of the gel channel during gel loading.

FIG. 1C shows a side view of the gel channel during gel loading, FIG. 1D shows a top view of the gel channel during gel loading.

FIGS. 2A, 2C, are diagrams showing a side view of the gel channel, FIG. 2A is before and FIG. 2C is after spheroid or organoid deposition. FIGS. 2B, 2D are diagrams showing a top view of the gel channel before (2B) and after (2D) spheroid or organoid deposition. FIGS. 2E and 2F are the flow conditions that can be generated inside the tissue construct after samples are inserted into the central well. FIG. 2E is a diagram showing a side view of a device receiving an interstitial flow applied into the central port. FIG. 2F is a diagram showing the front view of a device that has luminal flows inside vasculatures.

FIGS. 3A, 3C, and 3E are diagrams showing a side view of the gel channel during spheroid or organoid deposition. FIGS. 3B, 3D, and 3F are diagrams showing a top view of the gel channel during spheroid or organoid deposition.

FIGS. 5A-5C are cross-sectional presentations of a microfluidic device with three holes (top, FIG. 5A; side FIG. A-A, FIG. 5B; side FIG. B-B, FIG. 5C). FIGS. 5D-5F are cross-sectional presentations of a microfluidic device with one hole.

FIGS. 6E-6H are top views of a region of a device that has one well containing a tumor spheroid and one empty well. Confocal images were recorded at day 0 and day 2 showing that in a device with tumor spheroid that contain 231 TFM recruits better monocytes from the vasculature (FIGS. 6E, 6F) than device with MDA-MB-231 tumor cells and NHLFs co culture (231 TF; day 0, FIG. 6E; day 2, FIGS. 6F, 6G) or control devices (FIG. 6H) that have only gel in the well.

FIG. 6I is a graph showing the total number of monocytes migrating into the central well over the total number of monocytes in a 3×3 mm region of interest of the well on day 2.

FIGS. 7A-7C: FIG. 7A is a timeline for the study of interstitial flow effect, macrophage polarization on T-cell recruitment using a device that has tumor spheroid embedded in fibrin well. FIG. 7B demonstrates that tumor spheroids do not recruit T-cells before interstitial flow is applied. FIG. 7C shows that T-cells are recruited into the spheroid hole in the presence of interstitial flow from the spheroid toward the vasculatures.

FIGS. 8A-8F: FIG. 8A shows T-cell infiltration into the tumor spheroid compartment from the vasculature. FIG. 8B is the zoom of the rectangle area in FIG. 8A. FIG. 8C shows the cytotoxicity of tumor cells caused by infiltrating T-cells in the absence or presence of macrophages. B16 OVA spheroid without macrophages (FIGS. 8C, 8D) display tumor cells killed by specific OT-1 T-cells, shown by Annexin V signal. FIG. 8D is the zoom of the rectangle area in FIG. 8C. If the spheroid does not have macrophages (FIG. 8E), fewer OT-1 T-cells infiltrate to the B16-OVA tumor spheroid and no tumor cell is killed. FIG. 8F is a graph of the percentage of apoptotic and necrotic tumor cells and percentage of infiltrating T cells in the region of interest of 2×2 mm of devices with B16-OVA tumor spheroid with or without Raw 264.7 macrophages (RAW).

FIG. 9A is a prospective view of a device with two independent vasculature circuits for blood and lymphatic network co-cultures. An open-top channel is sandwiched between two other gel channels that have either blood or lymphatic vasculatures. All three gel channels are flanked by media channels. FIG. 9B is a prospective view of a mold for the fabrication of multiplexed devices. FIG. 9C is a cross-sectional view of section M-M of the device in FIG. 9A after seeding vasculatures and depositing several layers containing skin cells such as epidermis containing keratinocytes and melanocytes, dermis containing dermal fibroblasts, and hypodermis containing adipocytes. This 3D cell culture construct represents a skin model with several skin layers and perfusable vasculatures inside an open-top microfluidic device.

FIGS. 10A-10F and 10G: FIGS. 10A-10F are z-stack images of different devices having vascularized tumor tissue for monocyte migration characterization. From left to right and top to bottom, overlap z-stack images on day 2 of: a control device without a tumor spheroid (only matrix inside the central well, FIG. 10A), a device having a 231 TF tumor spheroid (FIG. 10B), a device containing a 31 TFM tumor spheroid (FIG. 10C), a device containing a spheroid composed of MDA-MB-468, fibroblast and macrophages co-culture (468 TFM, FIG. 10D), a device containing a 231 TFM tumor spheroid treated with drug X (FIG. 10E) or treated with drug Y (FIG. 10F). These two drugs are two experimental antibodies that can block monocyte migration. FIG. 10G is a graph of chemotaxis coefficients of monocytes inside the hole compartment in different conditions in the devices shown in FIG. 10A on day 2 and day 3.

FIGS. 11A-11F and 11G: FIGS. 11A-11F display two devices that have two tissue fragments of different weights, which are obtained from the same non-small lung cancer patient ex vivo tumoral tissues. Tumor tissues are fragmented into smaller pieces, before being reconstituted into a medium tissue sample (MTS) of 0.032±0.011 mg (FIGS. 11A, 11C, 11E) and a large tissue sample (LTS) of 0.2±0.048 mg (FIGS. 11B, 11D, 11F). Perfused monocytes are recruited by the ex vivo tissue, proved by a strong presence of monocytes inside the central hole compartment at day 2. FIG. 11G show the chemotaxis coefficient of monocyte in the central hole calculated on day 2 and day 3.

FIGS. 12A-12B: Example of an angiogenesis assay. Image of a device with a 231 TF spheroid on day 1 (FIG. 12A) and day 4 (FIG. 12B). New microvasculature vessels sprouting into the tumor spheroid by angiogenesis from the existing vasculatures were observed.

FIG. 13A: Comparison of the permeability of 10 kDa dextran in devices that have a presence or absence of an MDA-MB-468 TFM tumor spheroid. FIG. 13B: Comparison of the permeability of 200 nm-size nanoparticles in devices that have a presence or absence of an MDA-MB-468 TFM tumor spheroid.

DETAILED DESCRIPTION OF THE INVENTION

I. Definitions

Figure 1A:
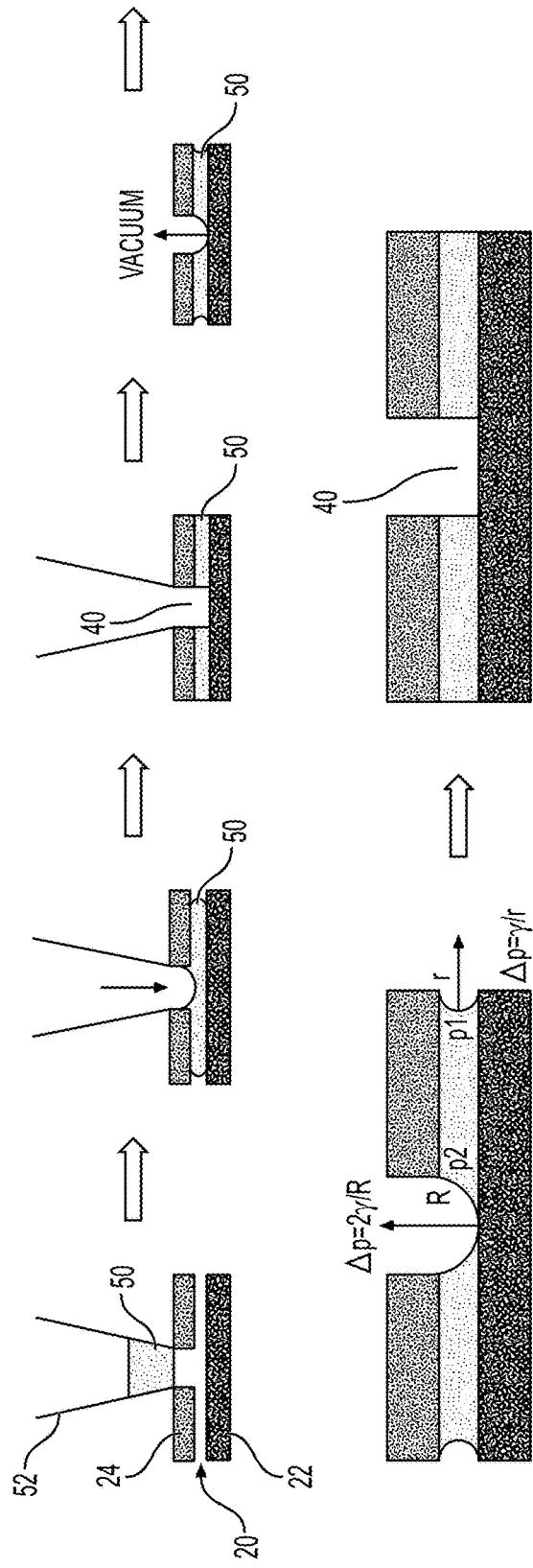
FIGS. 1A and 1B are flow charts showing the steps for gel loading of an exemplary gel channel with one port to form a vascular matrix with one hole.

As used herein, the term "microfluidic" refers to devices with dimensions of fluidic pathway elements for manipulating and controlling fluids, usually in the range of microliters ($10^{-6}$) to picoliters ($10^{-12}$). The microfluidic devices typically include a channel or a portion of a channel with dimensions from tens to hundreds of micrometers As used herein, the term "perfusable" refers to a structure permitting the flow of fluid through vascular elements. A perfusable tissue is a tissue having vascular elements crossing through the tissue and passing through the tissue. Vascular elements include hollow structures, such as hollow lumens lined with endothelial cells, and including capillaries and other blood vessels, etc. The vascular elements may include vascular networks.

As used herein, the term "infiltrate" refers to cells or tissues passing through vascularized and non-vascularized tissue masses. The infiltrate typically includes one or more of cells, extracellular matrix components, and exudate in an aqueous base. Examples of infiltrate components are immune cells isolated from blood including T-cells, monocytes, natural killer cells, neutrophils, B-cells, and cells. The infiltrate typically passes through the vascularized and non-vascularized tissue masses by movement around the cells of the vascularized and non-vascularized tissue masses, crossing any vascular elements, if present.

As used herein, the term "vascular network" refers to a network of vascular elements, such as a network of hollow structures, hollow lumens lined with endothelial cells, capillaries blood vessels, etc. Vascular networks may be within tissue masses, as well as outside of tissue masses. Tissue masses containing vascular networks are typically perfusable tissue masses.

As used herein, the term "tissue masses" refers to aggregates of cells self-assembling into three-dimensional masses. Tissue masses include tumors, spheroids, organoids, and other self-assembled masses. As used herein, "spheroids" typically refers to a cluster of cells from a cultured cell line. As used herein, "organoid" refers to cell clusters in extracellular matrix such as primary cells in an extracellular matrix ("ECM"). This can include tissues obtained by biopsy.

Recitation of ranges of values herein refer individually to each separate value falling within the range, unless otherwise indicated herein, and each separate value is incorporated into the specification as if it were individually recited herein.

Use of the term "about" is intended to describe values either above or below the stated value in a range of approximately +/−10.

II. Microfluidic Platforms

Microfluidic platforms for forming and culturing perfusable vascularized tissue and/or perfusable vascularized tissue masses have been developed.

The first platform with fully-formed and perfusable vascular networks that have empty holes dedicated to host spheroids or organoids provides a platform for studies using an established vasculature for co-culture with spheroids, organoids, cell monolayers, or cells in suspension. It also allows the perfusion of immune cells into the vasculature. The open-top hole can be dedicated to generate flow that passes through the tumor spheroid toward the vasculature, mimicking the interstitial flow of tumor microenvironments.

A. Microfluidic Platform Components

The platforms typically include one or more microfluidic devices (also referred to as "microfluidic chips"). The platform typically includes at least one microfluidic device. The platform may include between about 2 and 3, 4, 5, 6, 8, 10 or 12 microfluidic devices. The platform may include a single microfluidic device. Suitable sizes for the platform sides are between 5 mm and 280 mm. For example, the platform may have its sides with a length and width ranging between about 5 mm and 280 mm, between about 10 mm and 200 mm, between about 20 mm and 60 mm, between about 30 mm and 50 mm. In some embodiments, the platforms are the size of microscope slide cover glasses and are about 40 mm in length and 24 mm in width.

Each microfluidic device includes at least one gel channel. The gel channel typically includes two ends and a top surface and a bottom surface. The gel channel also includes one or more ports. Typically, the one or more ports of the gel channel are positioned at the top surface of the device and at a distance away from the two ends of the gel channel. The distance may be between about 1 mm and about 20 mm, such as between about 1 mm and about 15 mm, between about 1 mm and about 10 mm, between about 1 mm and about 5 mm, between about 5 mm and about 20 mm, such as between about 5 mm and about 15 mm, between about 5 mm and about 10 mm, or about 20 mm, or about 15 mm, or about 10 mm, or about 5 mm.

The microfluidic device typically includes openings connected to one or more columns or to tubing providing culture medium to the device. Fluid flow through the device channels is generally controlled by the hydraulic pressure of the culture medium and/or external pumps to generate the flows.

B. Three-Dimensional (3D) Cell Culture Constructs

Endothelial cells and stromal cells (for example, fibroblast, pericytes, astrocytes, muscle cells) are cultured in a hydrogel inside a hydrogel channel in a microfluidic device. Representative hydrogels include MATRIGEL®, agar, hyaluronic acid, methyl cellulose, and other water swellable natural or synthetic polymers. Inside the hydrogel, there is at least one empty space defined by the surrounding hydrogel and the bottom of the microfluidic channel. This empty space is connected to an open-top of the microfluidic device, forming a well. The gel channel is sandwiched between two media channels. Later, cells in the hydrogel form a network lined by endothelial cells that is also perfusable (FIGS. 3 and 4). Through the open top of the device that is connected to the empty region within the hydrogels, either a cell-line spheroid or stem-cell-derived organoid or patient tissue-derived organoid or gels with cells in suspension is inserted.

These spheroids, organoids, or ex vivo tissues can also be termed as "inserted sample". An inserted sample is first suspended in a buffer solution and transferred to the well that is also filled with a buffer solution. The inserted sample sinks to the bottom of the well. The buffer solution in the well is then removed and the well is filled with a second hydrogel. After gel solidification, in one configuration, the hole is then connected to a fluidic pipeline to generate interstitial flow from the samples toward the vascular networks and side channels. In another setup, the hole can perform as reservoir for the inserted tissue's specific media.

In one example, immune cells are perfused into the self-assembly perfusable microvascular tubes. Immune cells can be primary immune cells isolated from blood, for examples: T-cells, monocytes, natural killer cells, neutrophils, B-cells, or cell lines. Immune cells are recruited by the samples that secrete various chemokines.

In one example, hydrogels that are used for the culture of microvasculature and sample can be originated from either the same or different matrix types. They are either natural extracellular matrix such as fibrin, collagen I, collagen IV, Fibronectin, laminin, vitronectin, D-lysine, MATRIGEL® (a mixture of collagen, basement membrane matrix components such as laminin, and extracellular matrix proteins), Heparan Sulfide proteoglycans or artificial polymers such as polyethylene glycol, or the combinations thereof.

In one example, endothelial cells can be originated from primary endothelial cells from different organs such as umbilical vein endothelial cells, dermal vein endothelial cells, or differentiated from induced pluripotent stem cells, embryonic stem cells, or primary lymphatic endothelial cells from different organs. Stromal cells are primary cells from the connective tissues such as fibroblasts, pericytes, astrocytes or cells that are differentiated from induced pluripotent stem cells or embryonic stem cells.

In one example, solutions are perfused through the microvasculatures are applied, either separately or simultaneously with interstitial flow from the sample ports.

The system can be used for drug screening. For example, chemical or biological drugs are introduced into the system. Biological drugs can be therapeutic antibody or genetically-modified immune cells targeting any cell components of the 3D cell culture system, such as immune cells, vasculatures or cells inside the samples.

In one example, the sample is made by co-culturing tumor cells, connective tissue cells, immune cells or endothelial cells. They can form aggregates or solid tissues with a known composition. In one example, the sample is an organoid obtained by differentiation of stem cells in a well plate or in a gel. In one example, the sample is either animal tissue harvested from an animal or human tissue retrieved from a biobank or donated by a volunteering person. In one example, an endothelial monolayer is present in the media channel and covers the media channel, as well as a side of the gel of the gel channel. In another example, there are several cylindrical holes within the 3D cell culture device. These cylindrical holes contain either similar or different types of samples or only gel without a sample which serves as a control.

The independent microfluidic circuits can be arranged in a multi-array format to increase the throughput. For example, the multi-array device can be arranged in 6-,12-, 14-,48-,96- 384- or 1536 devices in a rectangular matrix. In one example, microvasculatures can mimic blood-brain barrier by culturing brain endothelial cells with astrocytes and pericytes.

C. Pre-Vascularized Device for Sample Integration by Customers

The pre-vascularized device can be supplied to a research institute for integration of its samples. This device has several hydrogel wells that are surrounded by perfusable vascular networks but without an inserted tissue and interstitial flow fluidic connector. Similar to the complete architecture described above, the pre-vascularized device is a 3D cell culture device including at least one microfluidic channel that has one or several empty wells formed by hydrogels that contain self-assembly 3D perfusable microvascular networks. The cylindrical hole is dry and has no cells inside. This pre-vascularized device can be used for the integration of its spheroids or cells into the empty wells. In one example, an endothelial monolayer is present in the media channel and covers the media channel, as well as one or both sides of the gel in the gel channel.

Devices with Both Blood and Lymphatic Endothelial Cells for Sample Integration A microfluidic device that has a gel channel having a cylindrical hole that contain samples, the gel channel is sandwiched between two other gel channels that contain lymphatic endothelial networks and blood endothelial networks respectively (FIG. 9).

Quantitative Assessment of the Effects of Interstitial Flows, Macrophage Polarization and Immunotherapy on Tumor Immune Cell Infiltration The device can be used to investigate the effect of various physical and biological components of the tumor microenvironment on immune cell recruitment. In one example, this platform allows integration of tumor spheroids into the hole where they are immediately in contact with a vascular bed that is also perfusable. The open-top hole is used to generate interstitial flows from the tumor spheroid toward the vasculature, mimicking the physiological interstitial flow emanating from a tumor. When tumor spheroids include mature M2 macrophages, they recruit more monocytes. The effect of a therapeutic multi-functional antibody candidate in preventing monocyte recruitment to the tumor spheroid was demonstrated using this system.

D. Exemplary Microfluidic Devices

1. Microfluidic Device With One Port

Figure 1B:
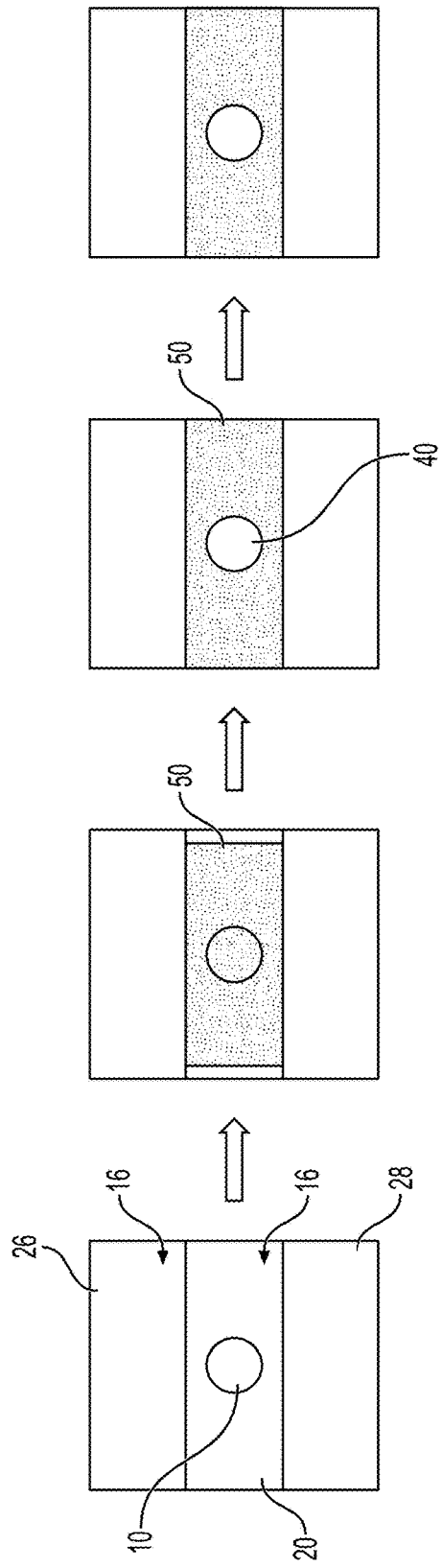

An exemplary microfluidic device with one port in a gel channel is shown in FIGS. 1A and 1B. In this embodiment, the microfluidic device (also referred to as "microfluidic chip") typically includes a gel channel 20 with a port 10 and two media channels 26 and 28. The two media channels 26 and 28 are positioned along the gel channel 20 and are separated from the gel channel 20 by phase guides 16 (See FIGS. 5A-5C: Cross-sectional image of a 3-gel-hole device; FIGS. 5D-5F. Cross-sectional image of a 1-gel-hole device).

The microfluidic device channels 20, 26, and 28 typically include a bottom surface 22 and a top surface 24. In some embodiments, the bottom surface 22 may be formed of glass, while the top surface 24 may be formed of a polymer. The port 10 is positioned on the top surface 24. Typical dimensions for the channels, which are preferably rectangular but may be round, are height between 200 and 500 microns, width between 5 mm and 1 cm, and length about 2 cm.

Typically, the gel channel has two open ends. The port 10 of the gel channel 20 is typically positioned at a distance away from the channel's two ends. The distance may be between about 1 mm and about 20 mm, such as between about 1 mm and about 15 mm, between about 1 mm and about 10 mm, between about 1 mm and about 5 mm, between about 5 mm and about 20 mm, such as between about 5 mm and about 15 mm, between about 5 mm and about 10 mm, or about 20 mm, or about 15 mm, or about 10 mm, or about 5 mm.

2. Microfluidic Device With Multiple Ports or Holes

Figure 1C:
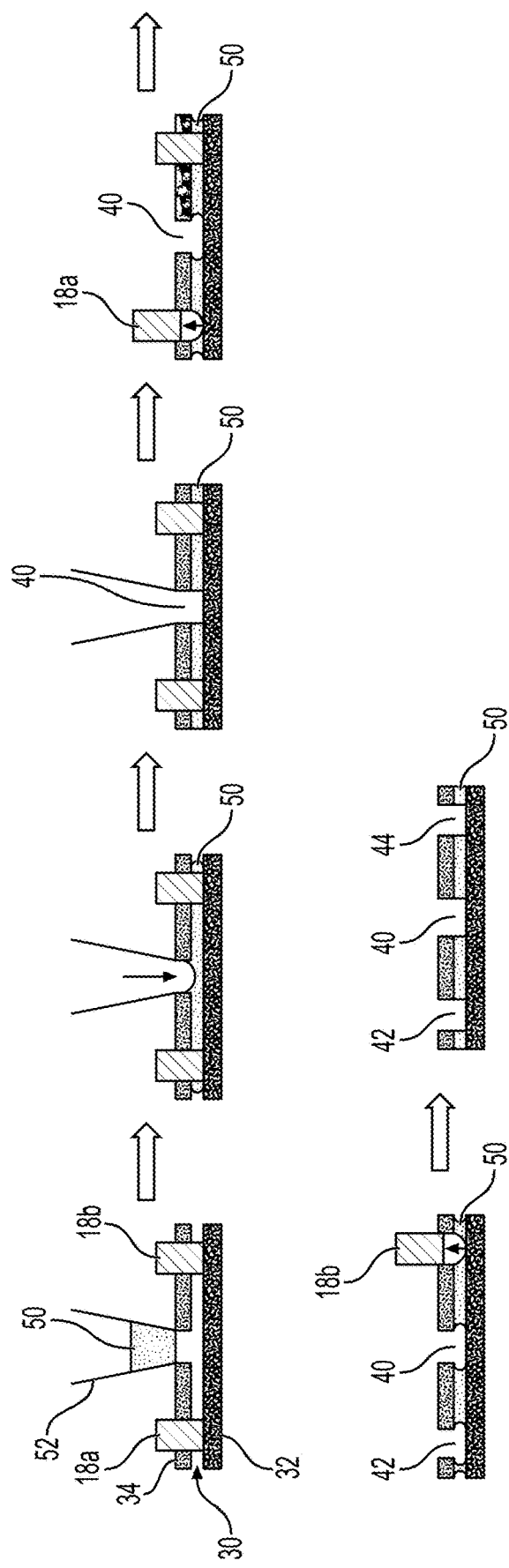
FIGS. 1C and 1D are flow charts showing the steps for gel loading of an exemplary gel channel with three ports to form a vascular matrix with three holes.
Figure 1D:
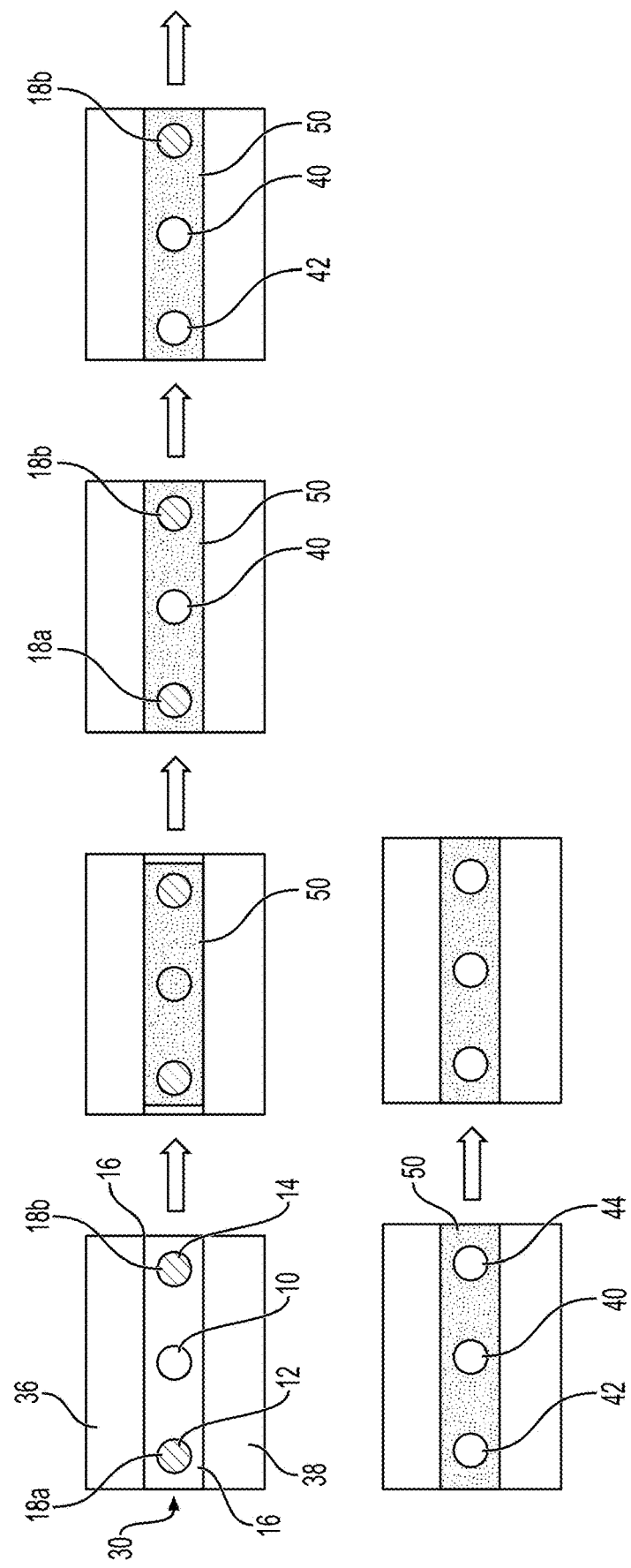

An exemplary microfluidic device with one port in a gel channel is shown in FIGS. 1C and 1D. Typically, the microfluidic device with more than one port will include spacers in the ports. For example, a microfluidic device with a gel channel 30 may include three ports 10, 12, and 14, where port 12 includes a spacer 18a and port 14 includes a spacer 18b. The spacers 18a and 18b typically match with their cross-sectional dimensions with the cross-sectional dimensions of the ports 12 and 14, for example, 0.5 to 5 mm. Typically, the gel channel 30 is positioned between two media channels 36 and 38. The two media channels 36 and 38 are positioned along the gel channel 30 and are separated from the gel channel 30 by phase guides 16. The microfluidic device channels 30, 36, and 38 typically include a bottom surface 32 and a top surface 34. In some embodiments, the bottom surface 32 may be formed of glass, while the top surface 34 may be formed of a polymer.

III. Methods of Making the Microfluidic Devices and Platforms

The microfluidic devices and platforms are typically formed of inert polymers such as polydimethylsiloxane (PDMS) and polysulfone (PSF). PDMS is a versatile elastomer that is easy to mold, and PSF is a rigid, amber colored, machinable thermoplastic. Other suitable materials include biologically stable thermosetting polymers, including polyethylene, polymethylmethacrylate, polyurethane, polyetherimide, polyimide, ultra-high molecular weight polyethylene (UHMWPE), cross-linked UHMWPE and members of the polyaryletherketone (PAEK) family, including polyetheretherketone (PEEK), carbon-reinforced PEEK, and polyetherketoneketone (PEKK). Preferred thermosetting polymers include polyetherketoneketone (PEKK) and polyetheretherketone (PEEK). Glass can be used as a part of the device, bonded to the plastic layer to create the microfluidic channel. These can be made using conventional methods such as molding or extrusion, and bonding of the device to a substrate such as a glass coverslip.

Methods of making microfluidic devices include stereolithography, soft lithography, laser machining, laser cutting, micromachining, micromilling, curing, bonding, 3D printing, molding, micromolding, and combinations thereof.

In some embodiments, the top layer, such as the top surface, and the bottom layer, such as the bottom surface, are made separately and then bonded together. In other embodiments, the top layer and the bottom layer are formed together through additive manufacturing.

The microfluidic devices may be formed to match the size of a cover glass to permit easy microscopic evaluation of tissues in the gel channel. The platform may be formed of any size suitable to accommodate a desired number of microfluidic devices.

IV. Methods of Using the Microfluidic Platforms

The platforms are useful to form in vitro perfusable vascular tissues and perfusable vascular tissue masses with infiltrates. Typically, the gel is seeded with about 4-12 million endothelial cells/ml with or without stromal cells such as 0.5 to 2 million/ml fibroblasts, astrocytes, pericytes or adipocytes.

In one embodiment, the perfusable vascular tissues are formed by the following process:
 a) Calculation of the precise gel solution volume that is equal to the gel channel volume minus the volume of the cylindrical gel holes.
 b) Injection of a gel solution containing cells into the microchannel from a vertical hole of the microfluidic chip.
 c) Pushing the gel further into the device using a bubble. Pins are removed from the wells when gels are still in a liquid state.
 d) The gel is kept from coming back to the hole due to surface tension of gel solution in the microfluidic channel.
 e) The hydrogel form of a hole is maintained until the gel solidification.

Typically, the methods include seeding a gel channel of the microfluidic platforms with a gel solution preferably containing cells via a port, gelling the gel solution to form a hole at the port, and initiating cell perfusion as well as interstitial flow through the vascular networks. Typically, after the cells have formed a vascular network, cells, a spheroid or an organoid sample is inserted into the hole or port in the gel tube.

The formed in vitro perfusable vascular tissue can be used as an in vitro model for studying different diseases. The formed in vitro perfusable vascular tissue masses with infiltrates may be used as in vitro models integrating tissue growth with immune system interactions, in vitro models for interaction between different tissue masses, as organ-on-a-chip or as human-on-a-chip.

Endothelial cells and stromal cells (fibroblast, pericytes, astrocytes, muscle cells, progenitor cells, and combinations thereof.) are cultured in a hydrogel inside the gel channel of the microfluidic device. Inside the hydrogel, there is at least one empty space defined by the surrounded hydrogel and the bottom of the microfluidic channel. This empty space is connected to an opening of the microfluidic device, forming a well. The gel channel is sandwiched between 2 media channels. Later, cells in the hydrogel form a network lined by endothelial cells that is also perfusable. Through the open top of the device that is connected to the empty region within the hydrogels, either a cell-line spheroid or stem-cell-derived organoid or cells in suspension or patient tissue-derived organoid is inserted. These spheroids, organoids or ex vivo tissues can also be termed as "inserted sample". An inserted sample is first suspended in a buffer solution then transferred to the well that is also filled with a buffer solution. The inserted sample sinks to the bottom of the well. The buffer solution in the well is then removed and the well is filled with a second hydrogel. In a configuration, after gel solidification, the hole is then connected to a fluidic pipeline to generate interstitial flow from the samples toward the vascular networks and side channels or inversely, from the vascular networks and side channels toward the samples.

A. Methods for Loading, Deposition, and Flow

1. Loading a Gel Channel With One Port

FIG. 1A is a flow chart showing the steps for gel loading of an exemplary channel with one port to form a vascular matrix with one hole. FIG. 1A shows a side view of the channel during gel loading. FIG. 1B shows a top view of the channel during gel loading.

Gel loading method for the formation of a gel hole with well-defined dimensions of 0.5 to 5 mm typically includes the following steps.

1. First, gel solution 50 containing stromal and endothelial cells is loaded inside a pipette tip 52 and positioned on a port 10 of a microfluidic chip that has a central gel channel 20 and two media channels 26 and 28.

2. Second, the gel solution 50 is pushed into the device. The gel channel 20 is separated from the media channels 26 and 28 by a phase-guide 16 that keeps the gel solution inside the gel. The gel solution 50 is confined inside the gel channel 20, which has a larger volume than the gel solution 50. The volume of the gel solution 50 is precisely calculated by subtracting the gel volume under the port from the volume of a full gel channel 20.

3. Third, the gel solution 50 is pushed further by generating a bubble at the port 10. As the gel solution 50 is pushed forward, the hydrophobic surface of the plastic becomes wet.

4. The pipette tip 52 is removed, creating a suction force that pulls the gel solution 50 to the port 10.

5. However, the gel channel 20, now wetted, creates a capillary force that pulls the gel solution 50 back to the wet microfluidic channel 20.

When the gel is pushed to the channel and wet the surface of the channel, the capillary force of the channel, which is proportional to the curvature of the gel within the channel, causes a pressure drop across the liquid-air interface. $p1 = P_{atm} - \Delta p1 > p2 = P_{atm} - \Delta p2$ because $\Delta p1 < \Delta p2$, where $\Delta p1$ and $\Delta p2$ are Laplace pressure or the pressure drop caused by surface tension in the gel channel and at the port respectively. p1 represents the gel solution pressure at the air-liquid interface inside the gel channel, p2 represents the gel solution pressure at the air-liquid interface inside the central hole, and $P_{atm}$ represents the atmospheric pressure.

Therefore, the surface tension generated by the gel channel keeps gel inside the channel and keeps the gel hole 40 empty and dry.

6. The hole 40 stays dried until gelification. Therefore, if there are some remaining cells within the hole 40, they will die out.

A perfusable vascular network lined by endothelial cells is formed due to paracrine secretion from fibroblasts. The networks surround the hole 40 but do not grow into it.

2. Loading a Gel Channel With Multiple Ports

In another embodiment, the gel channel may include more than one port and the formed vascular networks may include more than one hole. An exemplary method for loading these gel channels is shown in FIGS. 1C and 1D. FIGS. 1C and 1D are flow charts showing the steps for gel loading of an exemplary channel with three ports to form a vascular matrix with three holes. FIG. 1C shows a side view of the channel during gel loading, FIG. 1D shows a top view of the channel during gel loading.

Gel loading method for the formation of multiple gel holes with well-defined dimensions (0.5 to 5 mm diameters) typically includes the following steps.

1. Gel solution 50 is loaded into the gel channel 30 that has several ports, such ports 10, 12, and 14. Beside the gel-loading port 10, two other ports 12 and 14 each have a spacer 18a or 18b inserted.

2. When the gel solution 50 is released by the pipette tip 52, it fills the gel channel 30 partially.

3. The gel is pushed further, forming a bubble at the port 10, which later becomes a "dry" space within the gel slab.

4. The gel solution is still liquid, therefore when the two spacers 18a and 18b are removed from the device, the gel solution 50 is first pulled back to the port caused by the local vacuum from the moving spacers, then moves back to the gel channel 30 due to surface tension. Spacers may be a cylinder piece of metal or plastic that keeps the gel from flowing into the port during the loading process.

5. Remove other spacers. Tilting and shaking the device can help to relocate the gel solution from the port to the channel.

6. At equilibrium, the holes 40, 42, and 44 are dried and the device is left static for gelation.

3. Spheroid or Organoid Deposition and Interstitial Flow

Figure 2A:
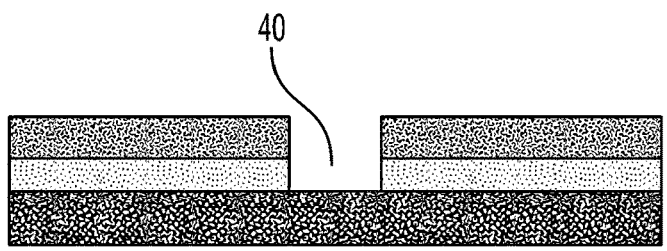
FIGS. 2A-2F are diagrams showing structures of the vasculature bed device with a central well with or without inserted samples.
Figure 2B:
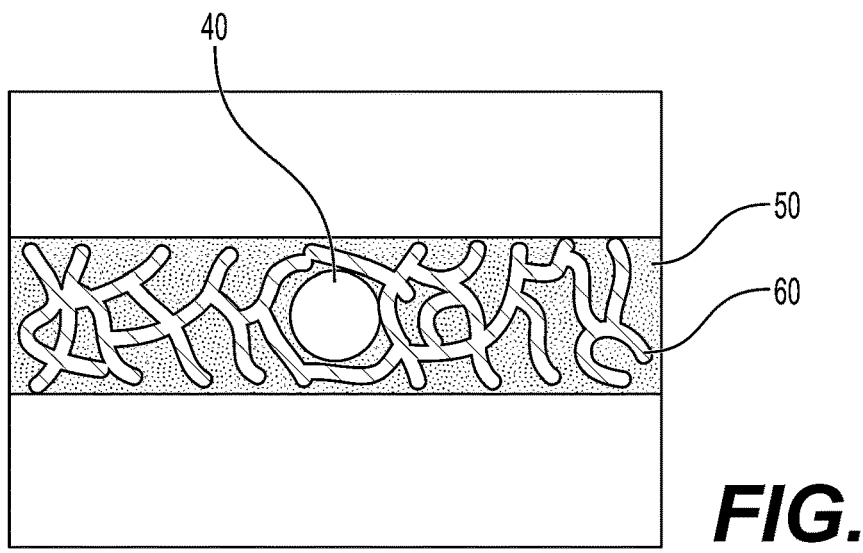
Figure 2C:
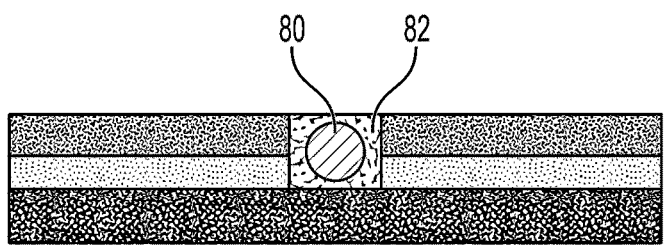
Figure 2D:
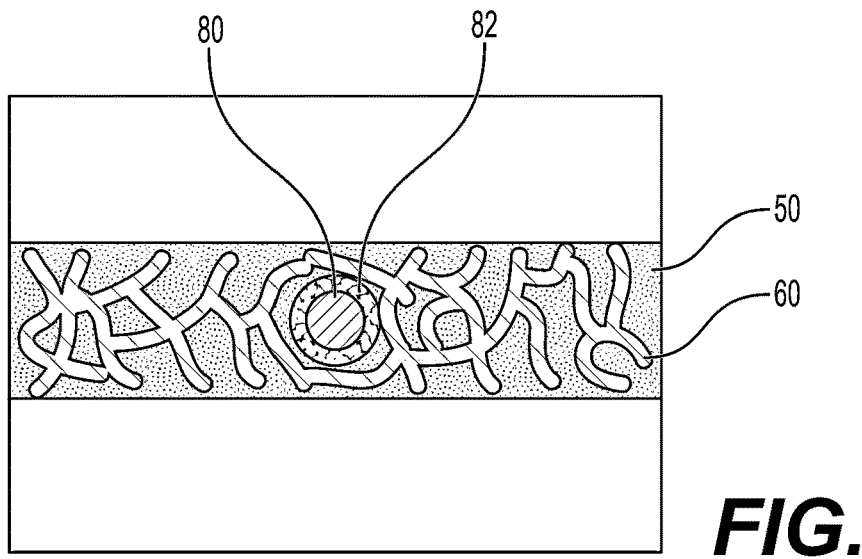
Figure 2E:
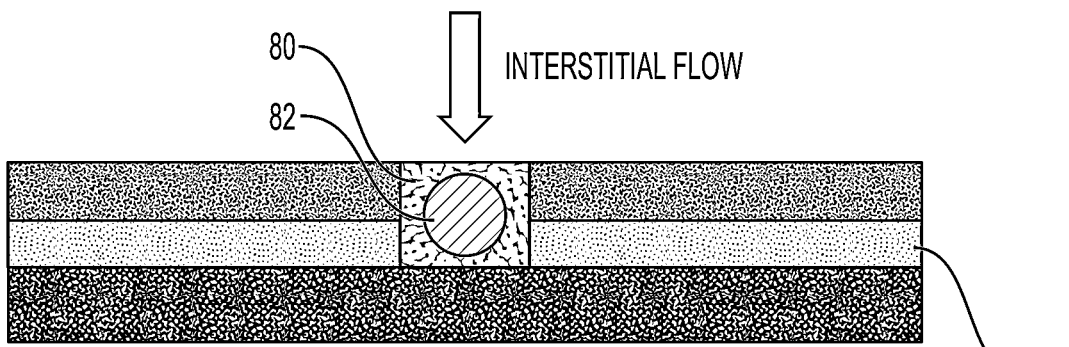
Figure 2F:
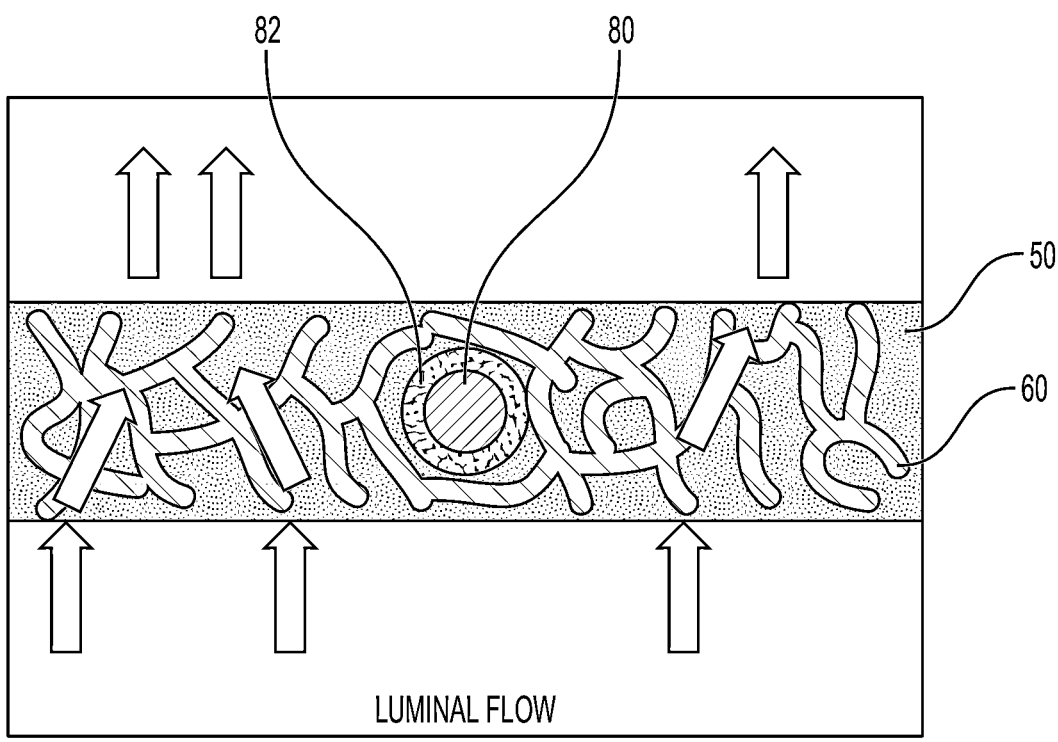

FIGS. 2A-2F are diagrams showing steps in spheroid or organoid deposition in a vascular matrix with one hole and interstitial flow and laminal flow through the spheroid or organoid. FIGS. 2A, 2C, and 2E are diagrams showing a side view of the channel during spheroid or organoid deposition. FIGS. 2B, 2D, and 2F are diagrams showing a top view of the channel during spheroid or organoid deposition.

The method of spheroid or organoid deposition and interstitial flow may include the following steps.

i. Spheroid or Organoid Deposition and Interstitial Flow in a Device With One Port 1. After five to seven days, vascular networks 60 are formed in gelled gel solution 50 with one gel hole 40.

2. Spheroid or organoid 80, suspended in a matrix 82 of choice, are added to the hole 40. If the matrix 82 is too viscous, the spheroid/organoid 80 can be stuck during the loading process. Therefore, the spheroid/organoid 80 can be suspended in a buffer and added to the hole. The spheroid/organoid 80 will come down to the bottom of the hole by gravity where the networks are in proximity. The buffer will then be removed and replaced by the matrix 82 of choice.

3. Two types of flow can be generated: (1) Interstitial flow from the top of the gel hole 40 toward the vascular networks. This flow is from the matrix-basal side of the endothelium toward the luminal side; and (2) luminal flows which are flows that can be generated by a pressure difference between two media channels across the vascular network 60.

ii. Spheroid or Organoid Deposition and Interstitial Flow in a Device With Three Ports Devices with multiple ports, and therefore, multiple gel holes, may be used where one sample hole is used for accommodating a tumor spheroid/organoid, and other holes serve as controls that have only matrix or non-tumor cells or a monolayer. These devices may also be used in integrating multiple spheroids/organoids into one single vascular bed to study the interaction between multiple spheroids/organoids. This can be used to create a multi-spheroid/multi-organ platform or human-on-a-chip that also includes a vasculature.

Figure 3A:
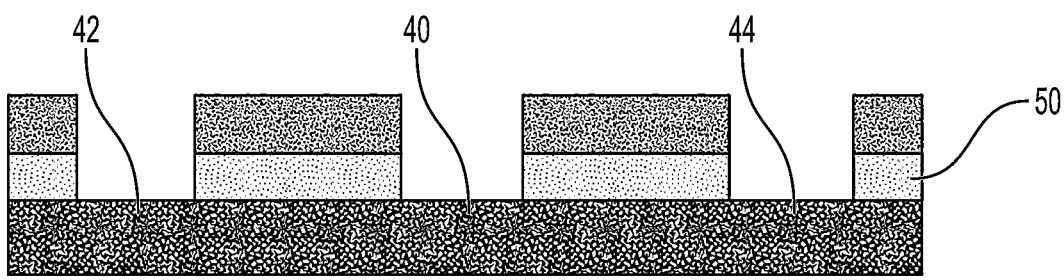
FIGS. 3A-3F are diagrams showing steps in spheroid or organoid deposition in a vascular matrix with three holes and interstitial flow and laminal flow through the spheroid or organoid.
Figure 3B:
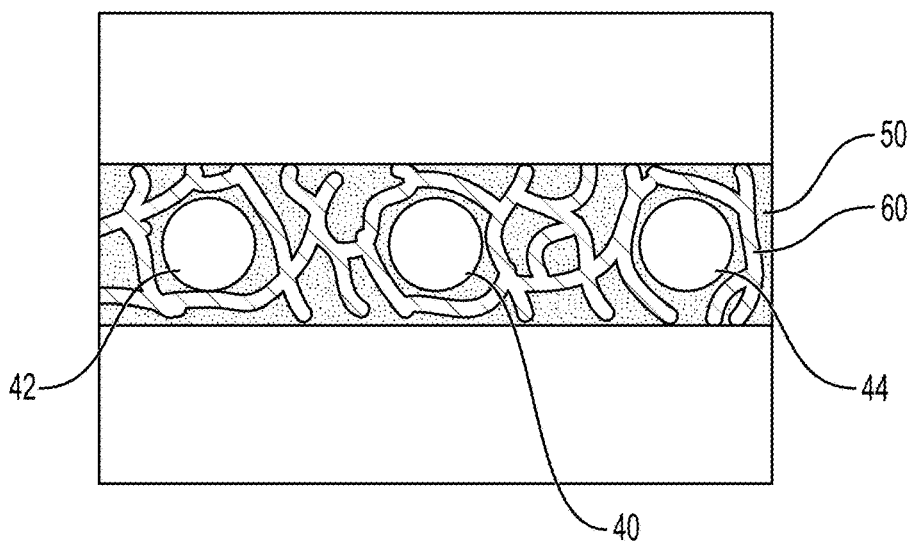
Figure 3C:
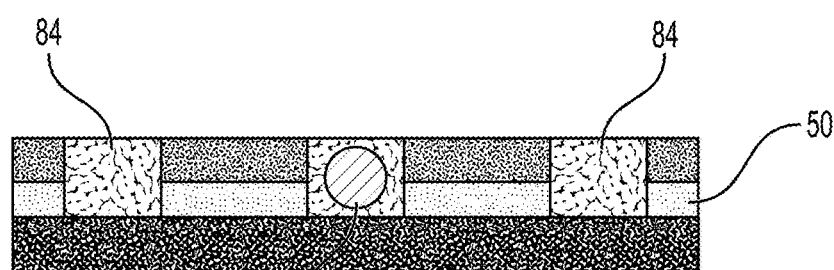
Figure 3D:
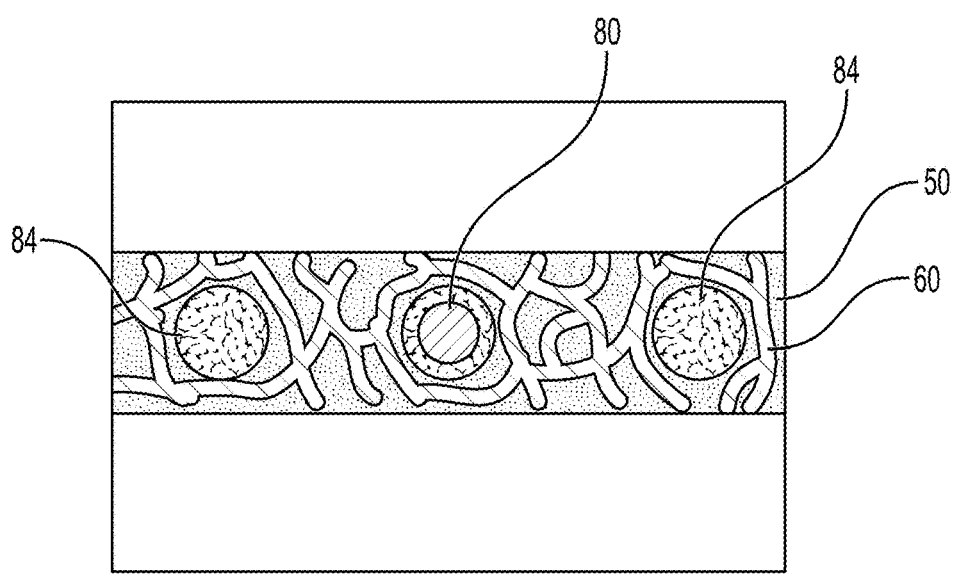
Figure 3E:
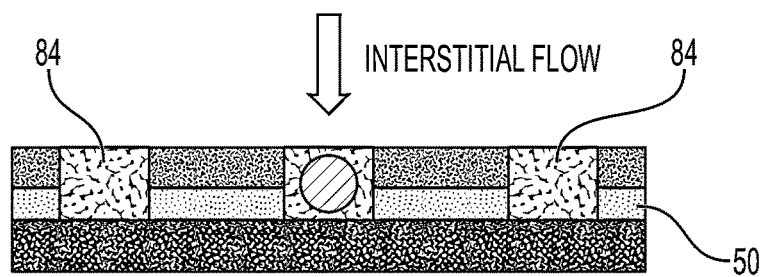
Figure 3F:
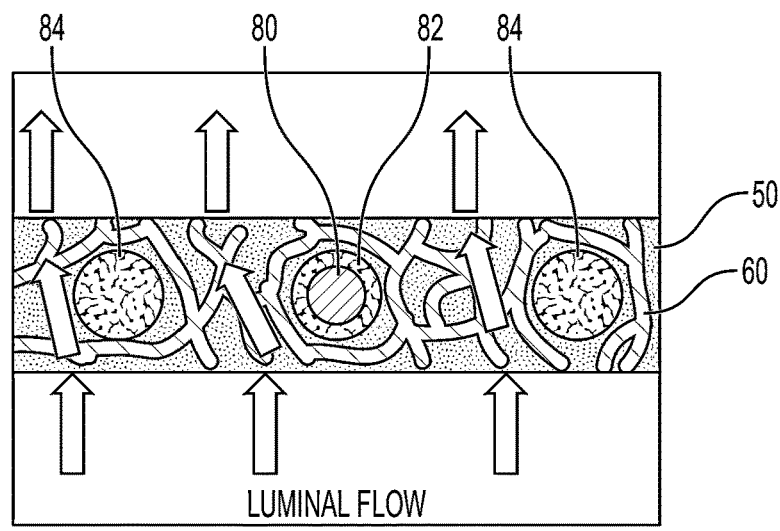

An exemplary device and spheroid or organoid deposition into the device are shown in FIGS. 3A-3F. FIGS. 3A-3F are diagrams showing steps in spheroid or organoid deposition in a vascular matrix with three holes and interstitial flow through the spheroid or organoid and luminal flow. FIGS. 3A, 3C, and 3E are diagrams showing a side view of the channel during spheroid or organoid deposition. FIGS. 3B, 3D, and 3F are diagrams showing a top view of the channel during spheroid or organoid deposition.

1. After five to seven days, vascular networks 60 are formed in gelled gel solution 50 with three gel holes 40, 42, and 44.

2. Spheroid or organoid 80, suspended in a matrix 82 of choice, are added to the hole 40. If the matrix 82 is too viscous, the spheroid/organoid 80 can be stuck during the loading process. Therefore, the spheroid/organoid 80 can be suspended in a buffer and added to the hole. The spheroid/organoid 80 will come down to the bottom of the hole by gravity where the networks are in proximity. The buffer will then be removed and replaced by the matrix 82 of choice. The gel holes 42 and 44 may be used as controls and be filled with only matrix 84, or non-tumor cells, or a monolayer.

3. Two types of flow can be generated: (1) Interstitial flow from the top of the gel hole 40 (as well as from the top of the gel holes 42 and 44), toward the vascular networks. This flow is from the matrix-basal side of the endothelium toward the luminal side; and (2) luminal flows which are flows that can be generated by a pressure difference between two media channels across the vascular network 60.

B. Generation of Interstitial Flow and Detecting Infiltrates

Figure 4A:
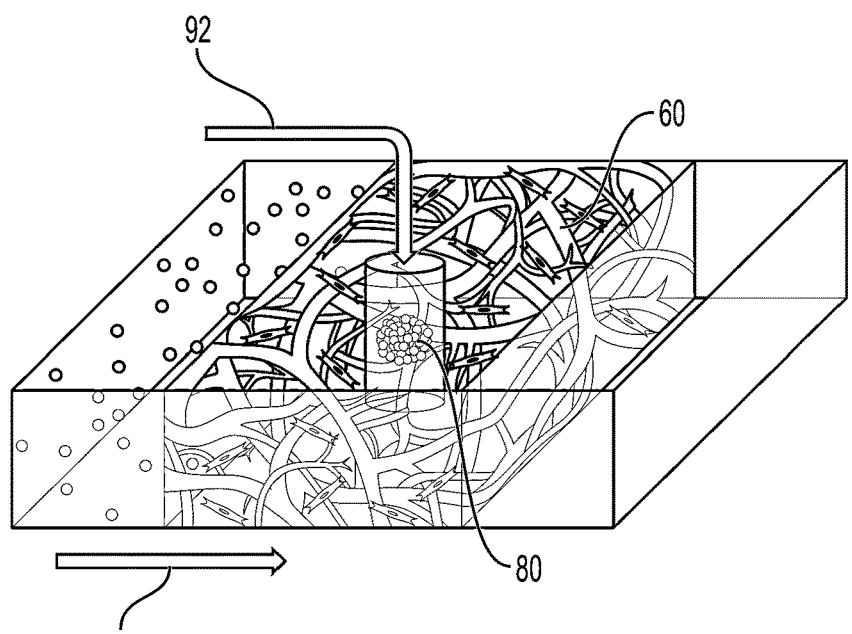
FIG. 4A is a diagram showing the direction of cell perfusion 90 and interstitial flow 92 through the vascular matrix with a spheroid or organoid 80.
Figure 4B:
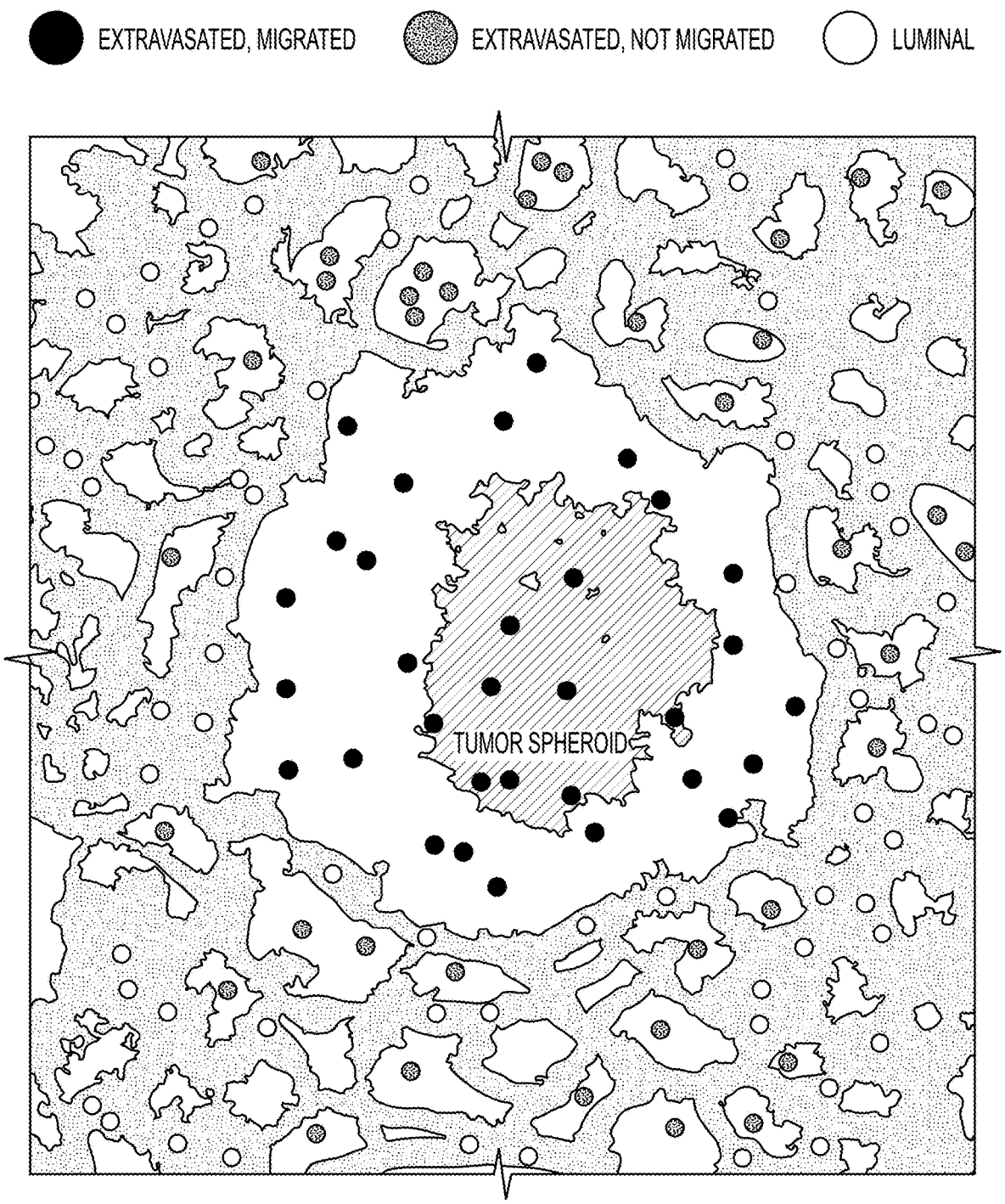
FIG. 4B is a diagram showing a quantification method based on vasculature and tumor spheroid. Immune cells flowing inside the vascular networks extravasate and migrate toward the tumor spheroid 80. They can be regrouped into three categories: (1) immune cells that extravasated and migrated toward the tumor spheroid, the ones that are inside the center volume below the hole and infiltrate the tumor spheroid; (2) immune cells that extravasate but do not move toward the tumor spheroid; and (3) immune cells that stay luminal (within the vascular network).

FIG. 4A is a diagram the direction of cell perfusion 90 and interstitial flow 92 through the vascular matrix with a spheroid or organoid 80. FIG. 4B is a diagram showing a quantification method based on vasculature and tumor spheroid. Immune cells flowing inside the vascular networks, extravasate and migrate toward the tumor spheroid 80. They can be regrouped into 3 categories: (1) immune cells that extravasated and migrated toward the tumor spheroid are the ones that are inside the center volume below the hole and infiltrate the tumor spheroid; (2) Immune cells that extravasate but did not move toward the tumor spheroid and; (3) immune cells that stay luminal.

Generation of interstitial flow and immune cell recruitment assay may use the following steps: flow may be applied from above the port of the device, passing across the extracellular matrix surrounding the spheroid and directed toward the vascular network.

The step of flowing medium through the gel channel typically includes the flow of culture medium through the channel controlled by hydraulic pressure applied to a culture medium. Typically the interstitial flow rates within the gel are between 0.001 to 10 µl/s.

Generally, the gel solution in the gel channel is incubated for a period between about 2 and about 10 days. Perfusable vascular tissues and perfusable vascular tissue masses with infiltrates typically form after about 2 days, although it may take up to about 10 days in an in-vitro culture.

The spheroid or organoid may then be imaged through the hole or port in the gel channel in the microfluidic device to visualize the infiltrates. This is facilitated by the short distances through the port to the tissue.

A schematic presentation of the quantification method based on vasculature and tumor spheroid is shown in FIG. 4B. Immune cells flowing inside the vascular networks, extravasate and migrate toward the tumor spheroid. They can be regrouped into three categories: (1) immune cells that extravasated and migrated toward the tumor spheroid are the ones that are inside the center volume below the port and infiltrate the tumor spheroid; (2) immune cells that extravasate but do not move toward the tumor spheroid; and (3) immune cells that stay luminal (within the vascular network). When immune cells migrate into a proximity of the tumor spheroid, they can interact with the tumor cells. Cell interactions include direct contacts to the tumor cells, their killing by cytotoxicity, modifications in gene expression, and change in cell phenotypes and cellular compositions of the spheroid.

Figure 5G:
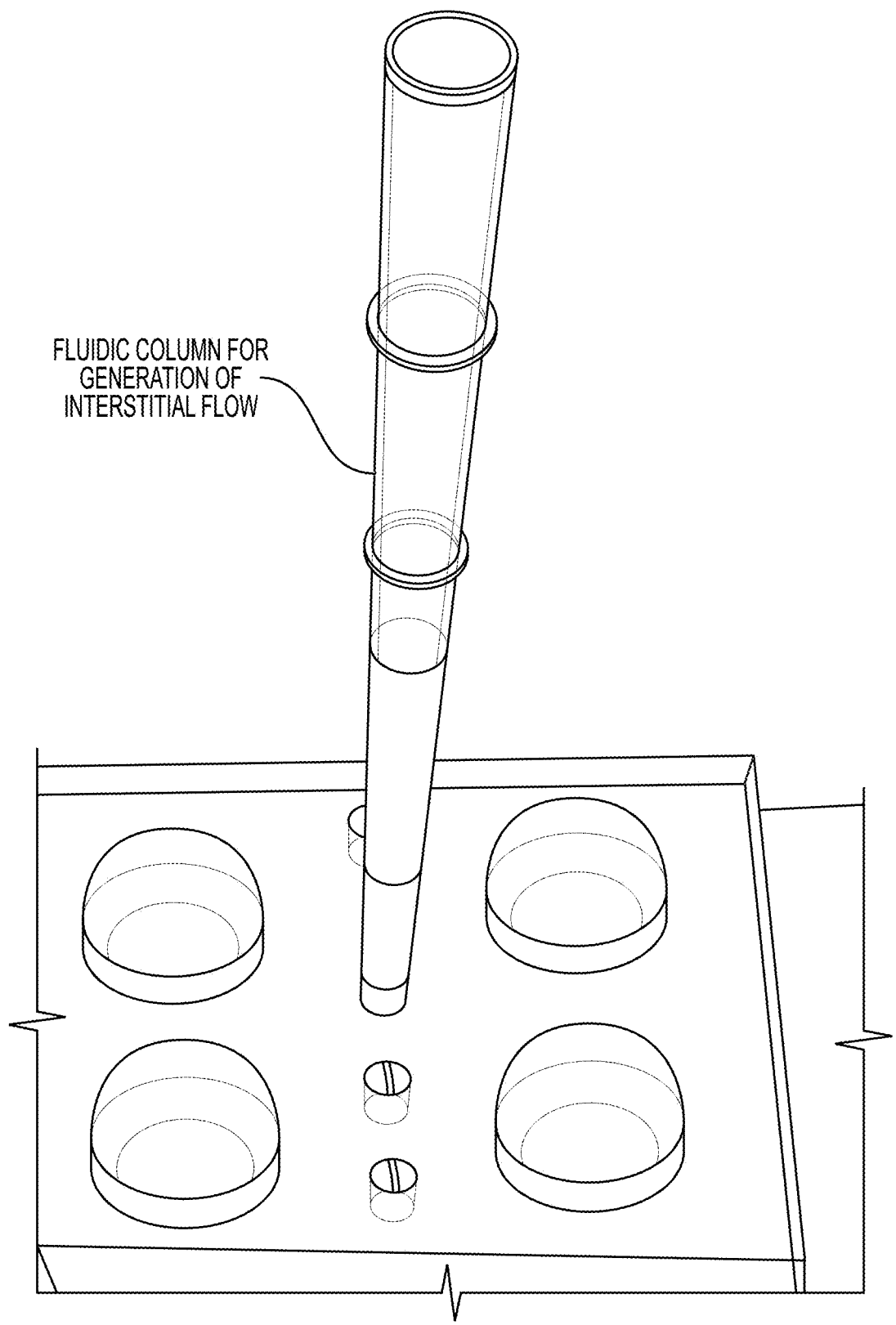
FIG. 5G is a Schematic projection of a device that has interstitial flows applied from an open-top to generate fluid flow from a sample outward. Interstitial flows that pass by the sample can be generated by applying a pressure head on the sample's compartment. The pressure head can be generated by a column of media or a pump. Generation of interstitial flow from the organoid toward the vasculature using a pressure head by a hydrostatic media column.

FIGS. 5A-5C are schematic projections of a device that has interstitial flows applied from an open-top to generate fluid flow outward from a sample. Interstitial flows that pass by the sample can be generated by applying a pressure head on the sample's compartment. The pressure head can be generated by a column of media or a pump. FIG. 5A-5C are schematic presentations of the top (FIG. 5A) of a microfluidic device with three gel holes as well as transverse (FIG. 5B) and sagittal (FIG. 5C) cross-sectional views of the same device. After the samples are added to the gel hole, interstitial flow is applied from an open-top to generate fluid flow outward from a sample. Interstitial flows that pass by the sample can be generated by applying a pressure head on the sample's compartment. FIGS. 5D-5F are diagrams showing different compartments within a one-hole microfluidic device when interstitial flows are generated. The pressure head can be generated by a column of media or a pump as shown in FIG. 5G, for a microfluidic device that has interstitial flows from the organoid toward the vasculature generated by a hydrostatic media column.

C. Models for Disease, Cellular Function and Angiogenesis

The platforms and devices can be used to establish in vitro models of diseases by replicating the inter-organ or inter-tissue interactions on one chip. The established perfused tissue masses with infiltrates may be used for the screening of therapeutic agents targeted toward, or genetic factors relevant to, the diseases. By using higher-magnification live imaging (e.g., 30-60×) with the devices, one can also dissect the morphological dynamics of cell migration, cell arrest, invadopodia formation, endothelial breaching, basement membrane invasion and early micrometastasis formation, all using the same device. Importantly, the technique is highly accessible to standard biology and engineering laboratories, conventional labware, a confocal microscope and standard cell culture equipment.

This device can also be used to establish a model of angiogenesis from a vascular network. Live-imaging, alignment of 3D images and subtraction of thresholded images can be used to identify the difference between images, which quantify the volume of 3D angiogenic sprouting of vessels into the samples.

D. Testing and Screening

The devices are useful for studying the effects and/or effective dosage of therapeutic, prophylactic and/or diagnostic agents, for assessing an immunological role or effect on vascular structures, and for characterizing cellular interactions between the sample and the vascular network. The agent(s)e can be applied directly to the sample or vascular network through the entry/sample port in the gel channel. The effects of the agents can be assessed visually through the entry/sample port, by detecting and/or measuring cell viability, phenotype, cell migration or cell composition, cellular function (such as contraction of heart cells or production of insulin by islet cells) or changes in gene expression or products produced by the cells in response to the agent, or by other means of quantitating cells or cellular products or changes therein over time as a function of the agent. For example, angiogenesis can be assessed by looking at the proliferation or ingrowth of vascular cells into the sample and toxicity can be assessed by a decrease in cell number.

In summary, a 3D vascular cell culture model that allows the creation of an off-the-shelf in vitro human microvasculature containing hollow spaces for the insertion of spheroids or organoids. This is unique in terms of the device and method used to create the hollow space structures within a perfusable vascular network. This system allows the study of immune-tumor cell interactions. In this platform, a tumor spheroid is surrounded by blood vessels, supporting extracellular matrix and stromal cells, similar to the in vivo human tumor microenvironment. With the support of perfusable networks surrounding the tumor, immune cells can flow into the blood vessels. Using confocal imaging, the 3D microvasculature, tumor and extravasating immune cells are imaged, and the number of immune cells trafficking across blood vessels and migrating toward the tumor in real-time is quantified at high resolution. Compared with the methodology used for other in vitro cell culture systems, this technique should better reproduce the complexity of a tumor by incorporating a perfusable microvasculature. Moreover, compared with the standard mouse xenograft model that uses human cells, this system offers high-resolution real-time imaging of tumor cell development and their interaction with immune cells within its complex microenvironment, while offering tight control of cell composition and physical parameters such as extracellular matrix composition and interstitial pressure.

Microfluidic devices contain gel inside a central compartment, which is flanked by channels containing cell culture media. In one embodiment, posts or a partial wall are used to keep gel confined within a channel while keeping in contact with cell culture media in adjacent channels. In another embodiment, an entry port for the gel solution loading is introduced and a new gel loading method, a method for generating a vascular bed with a defined morphology, interstitial and luminal flows and a new quantification method for cell migration are described. The method creates a well-defined 3D structure of gel inside a microfluidic device channel.

Prior art microfluidic devices have a central gel channel between two media channels. In this setup, there are one or several vertical ports on top of the gel channel (FIGS. 1A-1D). The channel has a port from which a gel is injected that fills the channel underneath. First, the gel is filled into the central gel region. At the end of the injection, the gel is pushed further, and the gel is evacuated from the space underneath the port. Once the gel is empty in the pipette tip orifice, the gel is pushed further to generate a bubble that pushes the gel inside the hole away. Then the pipette tip is removed, and the gel solution tends to regress back to the hole. However, due to the capillary force within the channel, the gel solution does not move back up the port and is therefore held by the border of the port, leaving the gel adopting the form of the vertical hole (FIG. 1A).

FIG. 1A illustrates the effect of capillary forces on maintaining the gel shape. Using the principle of a capillary trap, one can make several gel holes within a gel slab by using spacers that block the gel from coming into a hole during gel loading. When the spacer is removed, it generates a vacuum that takes the gel coming back up the hole but is prevented from doing so by the capillary trap, thus allowing the gel to evacuate from the hole. One can also shake or tap the device gently to help the gel evacuate the hole. A successful device loading has an empty hole and media cannot travel into the hole. As the hole is dried, the vasculatures are perfusable and surround the hole but do not grow into the hole.

In summary, a 3D cell culture microdevice including at least one microfluidic channel containing a vascularized network in a hydrogel, having a hole or port, is used to form a cell-line spheroid, stem-cell-derived organoid, cells in suspension or patient tissue-derived organoid (also termed "samples"). The 3D perfusable microvascular networks are created by co-culturing endothelial cells with stromal cells inside a hydrogel that forms at least one cylindrical hole, the cylindrical hole is filled with a second hydrogel that contains sample(s). The sample(s) can receive media from the top port through a fluidic pipeline to generate interstitial flow from the samples toward the vascular networks and side channels. The microvascular network is formed from cells such as endothelial cells are originated from umbilical vein endothelial cells, induced pluripotent stem cells, lymphatic endothelial cells. The microfluidic chip may be continuous or discontinuous perfusion flows through the vasculatures are applied, either separately or simultaneously with interstitial flow from the sample ports.

In one embodiment the 3D cell culture device includes an endothelial monolayer in the media channel(s), which covers the media channel, as well as the side of the gel channel. In another embodiment, there are several cylindrical holes, the cylindrical holes containing similar or different types of samples or control gel without a sample.

Several independent microfluidic circuits can be arranged in a multi-array format to increase the throughput, the multi-array device can be arranged in 6-,12-,14-,48-,96-, 384- and 1536 devices in a rectangular matrix.

The device can be used for screening chemical or biological agents applied to treat the cell sample. The agents can be therapeutic, prophylactic and/or diagnostic. One advantage of this system is that the vasculatures can mimic blood-brain barrier by culturing brain endothelial cells with astrocytes and pericytes. Examples of biological drugs include therapeutic antibodies targeting immune cells, vasculatures or samples. The 3D cell culture device can be used for testing of specific cell types, such as where the sample is made by co-culturing tumor cells, connective tissue cells, immune cells or endothelial cells. These may be in the form of aggregates or solid tissues with a known composition. For example, the sample can be an organoid obtained by differentiation of stem-cells in a well plate or in a gel. The sample can be cells in suspension in media or hydrogels. The sample can be ex vivo tissue that is either animal tissue harvested from an animal or human tissue retrieved from a biobank, obtained by biopsy, or donated by a volunteering person. The sample can be deposited either by a pipette or automatically by a bioprinter nozzle.

The system can be used for a variety of screens or testing, for example, to characterize immune cell recruitment by the samples in the devices, by the quantification of immune cells perfused into the vascular networks that leave the blood vessels and migrate into the extracellular matrix containing the sample and interact with the sample, where the interaction include direct contact to the samples cells, their killing by cytotoxicity, modifications in gene expression, and/or change in cell phenotype and cellular composition. In one embodiment, the device is used in a process for quantification of 3D angiogenesis by time-lapse imaging of the device. At several time points, images are aligned and thresholded images subtracted to get the difference between images, which quantifies the volume of 3D angiogenic sprouting of vessels into the samples.

The present invention will be further understood by reference to the following non-limiting examples.

Example 1: Formation of Tumor Microenvironment for Testing

Materials and Methods

This device and method were used to create a tumor microenvironment in vitro. The gel solution had gel precursors and endothelial cells (for example, dermal, umbilical, and/or brain endothelial cells) and stromal cells (for example, fibroblasts, pericytes, astrocytes) in suspension in a fibrin gel solution and was injected into the device as described in FIGS. 1A and 1B. Later, endothelial cells created a blood-vessel-like network that was also perfusable. The hole remains dried, without media, and surrounded by a vascular network. The blood vessel network structure surrounded the empty space in the hole and adopted a form similar to the hole.

A tumor spheroid was placed inside this hole, as shown in FIGS. 2A-2F. The tumor is suspended in collagen or a mixture of collagen and fibrin, or MATRIGEL®. Ex vivo tissues from a patient or an animal can also be incorporated into the gel hole within the vascular bed. This system adds further complexity whereby the fluidic connection is sealed and a fluid flow is applied from the top of the spheroid to the media channel. Generating fluid flow from the top of the spheroid toward the media channels recapitulates interstitial flows, which is a benchmark of several solid tumors. Multi-hole designs (FIGS. 3A-3F) have the advantage of being able to integrate controls to the experiment. Moreover, several organoids can be integrated into a vasculature bed to study the interaction between organoids. This platform can be further developed toward a vascularized human-on-a-chip model in which several organoids (including brain, heart, kidney, etc.) are connected by a vascular network.

Results

Endothelial cells were cultured within the gel, which created 3D blood vessel structures lined by endothelial cells. This 3D blood vessel structure allowed the perfusion of immune cells. In addition, the flow coming from the inlet on top of the tumor spheroid supported immune cells as they extravasated and migrated toward the spheroid by chemotaxis. This event was characterized quantitatively. The immune cell populations were divided based on their relative position to the blood vessels and the central hole. By quantifying the number of immune cells that were inside the central hole, the percentage of the cells that extravasated and migrated in the gel among all cells in the region of interest was characterized.

Example 2. Monocyte Recruitment by Tumor Spheroids

The platform can be used to study the effects of tumor-associated macrophage within a tumor spheroid on monocyte recruitment.

Materials and Methods

Figure 6A:
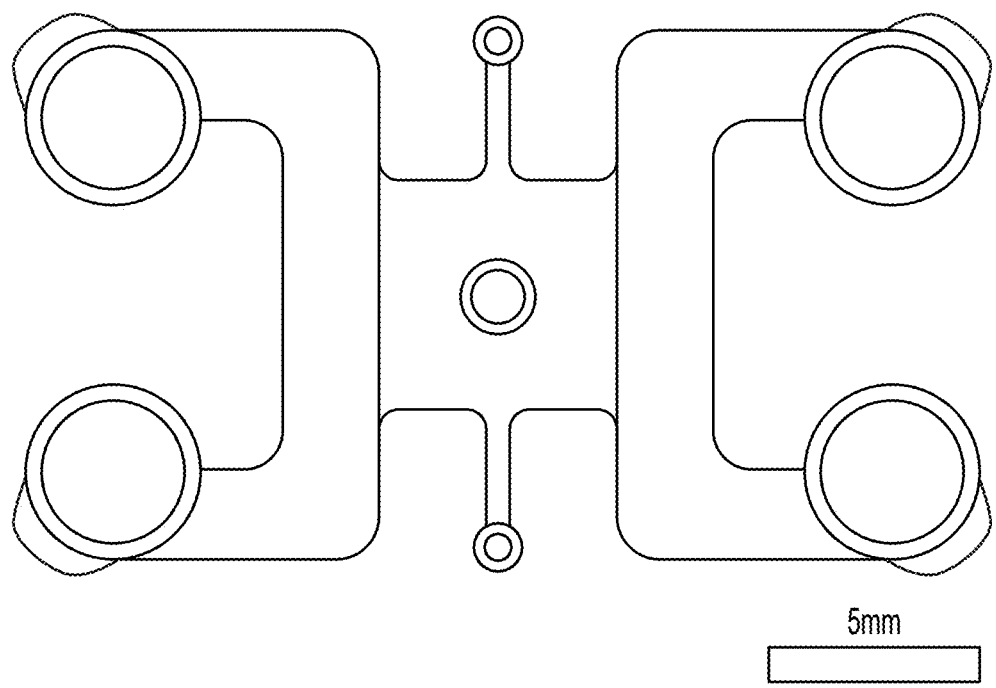
FIG. 6A is a view of the microfluidic chip (transparent) without cells. The gel channel is sandwiched between two media channels and has an open-top well at the center.
Figure 6B:
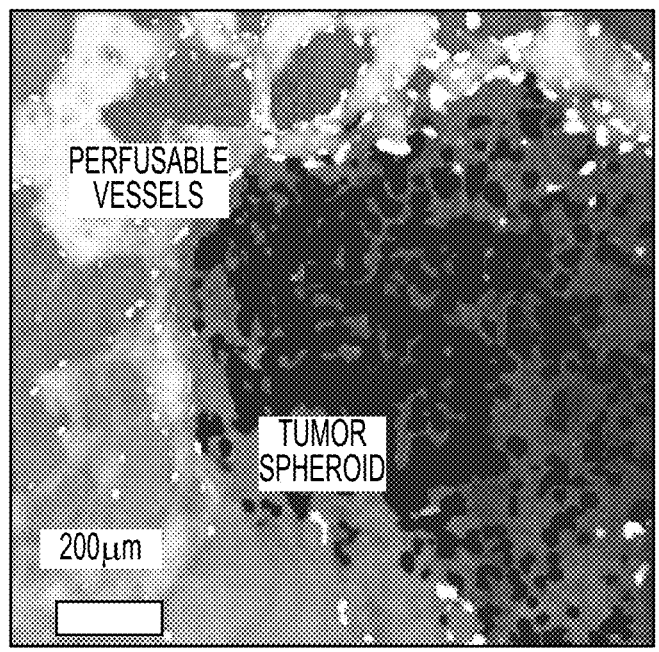
FIG. 6B is a micrograph of the microfluidic device with tumor spheroid surrounded by vasculatures perfused with blue Dextran.
Figure 6C:
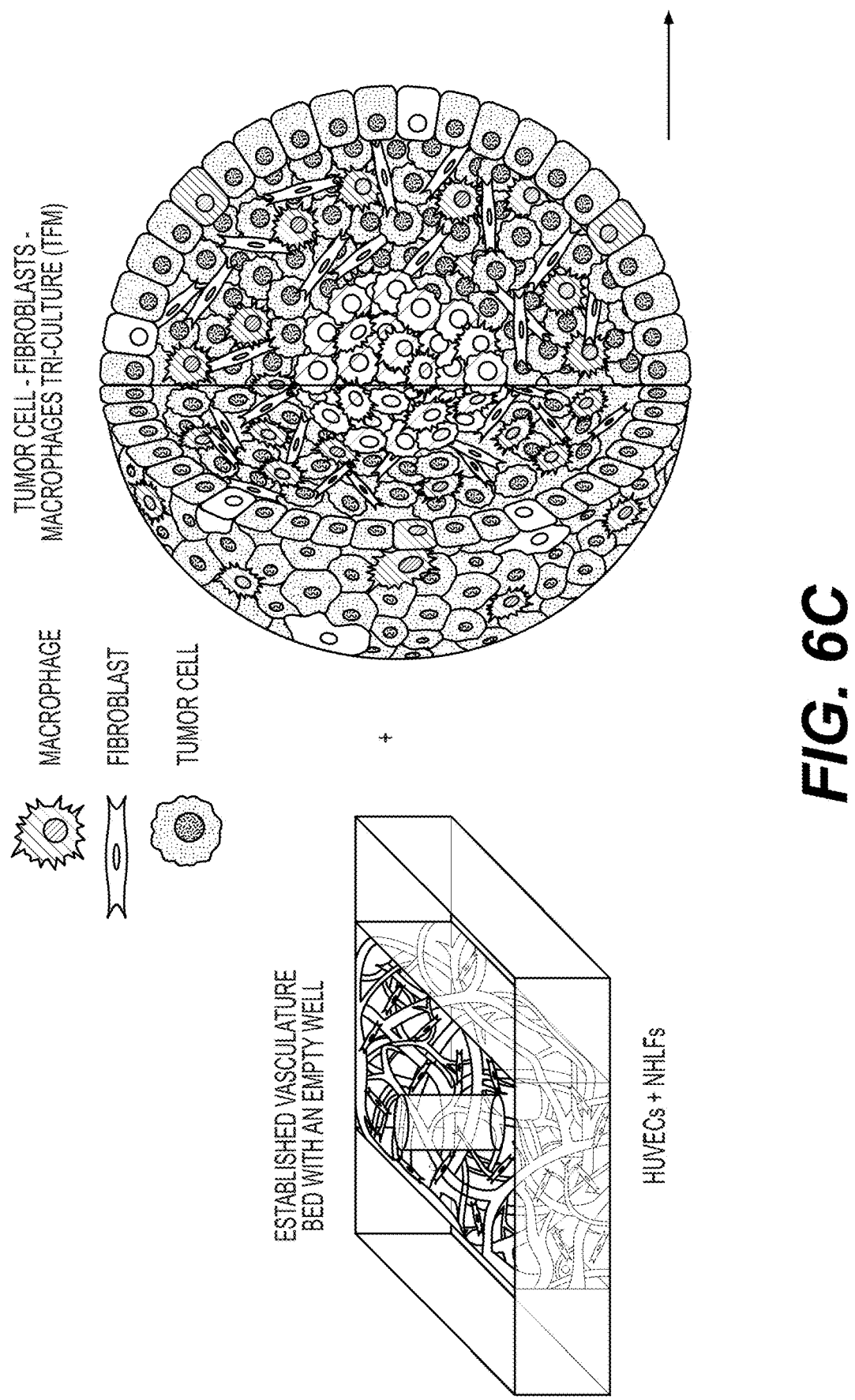
FIG. 6C is a flow chart of the fabrication of the vascularized tumor tissue and monocyte recruitment assays. First, perfusable vascular networks are created by seeding human umbilical vein endothelial cells (HUVECs) and normal human lung fibroblasts (NHLFs) in fibrin gels before inserting tumor spheroids made by triculture of MDA-MB-231 tumor cells, NHLFs and macrophages differentiated from bone-marrow derived monocytes, denoted 231 TFM. The tumor spheroid is suspended in collagen-fibrin mix. Monocytes and drugs are then applied to the device by perfusion flows through the vascular networks.
Figure 6C:
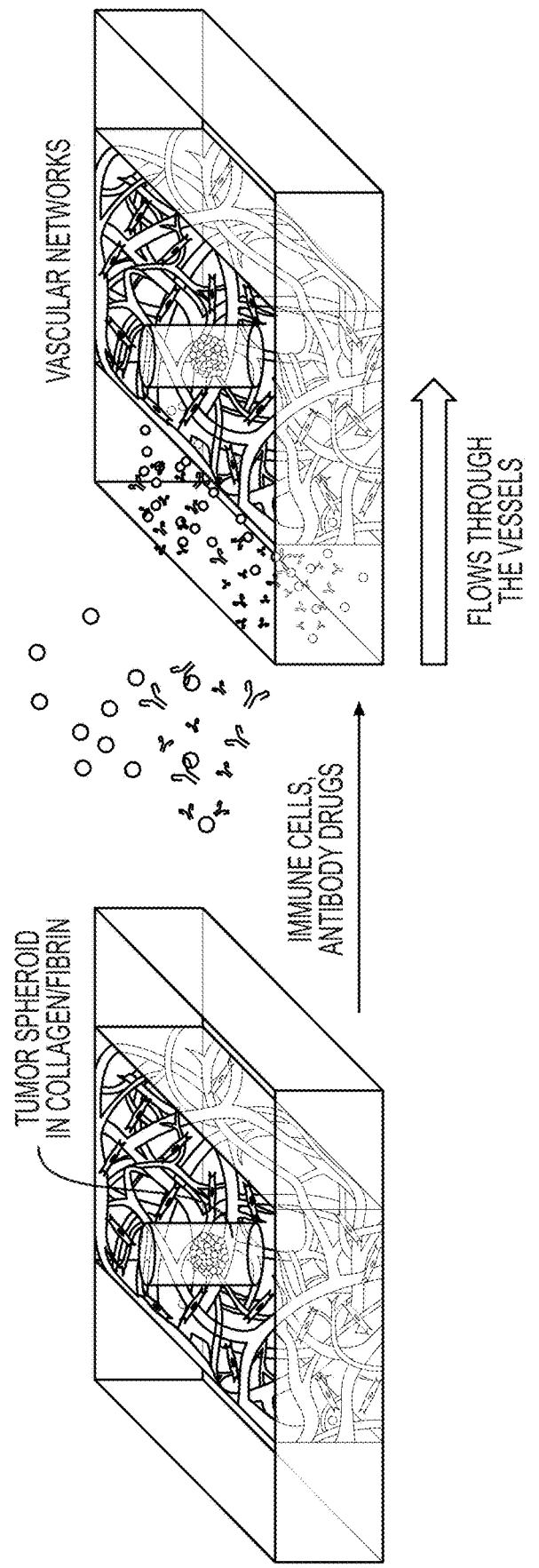
Figure 6D:
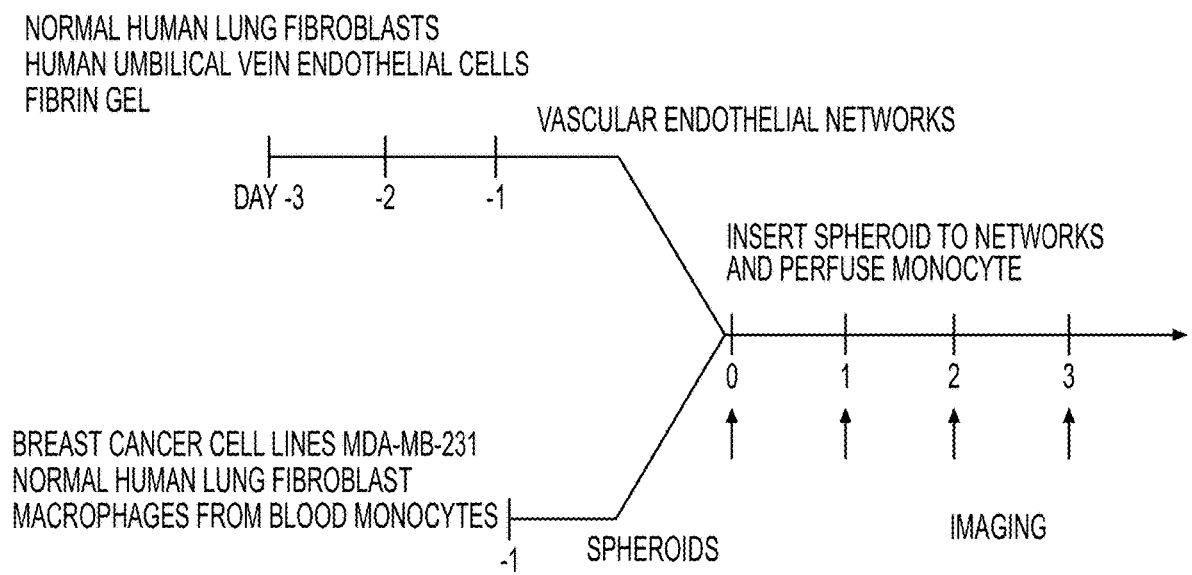
FIG. 6D is the experimental timeline of cell culture and imaging.

A polydimethylsiloxane device with several vertical holes on top of the gel channel was used to create a perfusable vascular network. The microfluidic chip is illustrated in FIG. 6A and the tumor tissue with perfusable vasculature is illustrated in FIG. 6B. To create the tissue, a fibrin gel solution that has HUVECs and NHLFs in suspension was injected into the device. These form a blood-vessel-like network that is perfusable (FIG. 6C). FIG. 6C is a flow chart of the fabrication of the vascularized tumor tissue and monocyte recruitment assays. First, perfusable vascular networks are created by seeding human umbilical vein endothelial cells (HUVECs) and normal human lung fibroblasts (NHLFs) in fibrin gels before inserting tumor spheroids made by triculture of MDA-MB-231 tumor cells, NHLFs and macrophages differentiated from bone-marrow derived monocytes, denoted 231 TFM. The tumor spheroid is suspended in collagen-fibrin mix. Monocytes and drugs are then applied to the device by perfusion flows through the vascular networks. FIG. 6D is the experimental timeline of cell culture and imaging. FIGS. 6E-6H are top views of a region of a device that has one well containing a tumor spheroid and one empty well. Confocal images were recorded at day 0 and day 2 showing that in a device with tumor spheroid that contain 231 TFM recruits better monocytes from the vasculature (6E, 6F) than device with MDA-MB-231 tumor cells and NHLFs co culture (231 TF; day 0, 6E; day 2; 6F; 6G) or control devices (6H) that have only gel in the well. FIG. 6I is a graph showing the total number of monocytes migrating into the central well over the total number of monocytes in a 3×3 mm region of interest of the well on day 2.

Tumor spheroids were formed by coculturing MDA-MB-231 tumor cells (T), NHLFs (F), with or without nonpolarized macrophages (MO) differentiated from bone marrow-derived monocytes in a low-adhesion 96 well-plate. The spheroid obtained from the tri-culture of MDA-MB-231 tumor cells, fibroblasts and macrophages is denoted 231 TFM while the one obtained from the co-culture of MDA-MB-231 tumor cells and fibroblasts is denoted 231TF. One day after inserting a tumor spheroid into the vascular networks through the hole together with collagen/fibrin mix, freshly-isolated monocytes were perfused into the networks by luminal flow.

The platform was then imaged every day and daily monocyte migration from vasculatures to the tumor spheroid compartment was characterized (FIG. 6D).

Results

Monocytes extravasate and migrate more readily from the vasculatures into the gel well that contains a triculture 231 TFM tumor spheroid at day 2 (FIG. 6F) than day 0 (FIG. 6E) and than the tumor spheroid does not have macrophages (231 TF, FIG. 6G) at day 2 or control devices without a tumor spheroid (FIG. 6H) at day 2. The ratio of the number of monocytes inside the central hole to the total number of monocytes inside the region of interest of 3×3 mm confirms higher migration into the hole on day 2 (FIG. 6F).

These data demonstrate that the presence of macrophages in the tumor spheroid is essential for monocyte recruitment from vasculatures.

Example 3. T-Cell Recruitment by Tumor Spheroids

Materials and Methods

Using a system as in Example 2, tumor spheroids were made by co-culturing mouse B16-OVA melanoma cells, normal human lung fibroblasts and inserting them into a perfusable HUVEC network. OT-1 T-cells were then perfused into the network.

This platform was then used to characterize the infiltration of T-cells into a tumor to kill the tumor cells. Tumor spheroids were made by co-culturing mouse B16-OVA melanoma cells, normal human lung fibroblasts and inserting them into a perfusable HUVEC network. OT-1 T-cells were then perfused into the network.

Results

The results showed that OT-1 T-cells only extravasate when an interstitial flow is applied. Extravasated OT-1 T-cells specifically killed B16-OVA melanoma cells, as characterized by Annexin V apoptosis staining (FIG. 8). When Raw 264.7 macrophages are present in the tumor spheroid co-culture, fewer less OT-1 T-cells are recruited into the tumor spheroid.

Figure 8A:
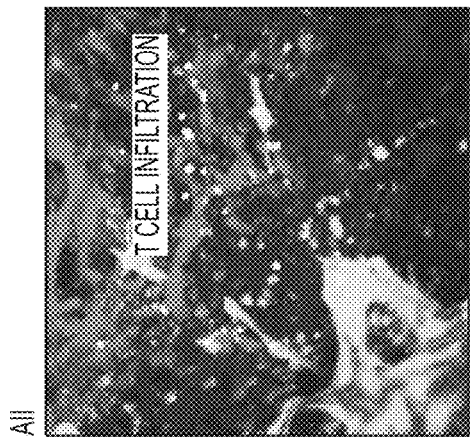
Figure 8B:
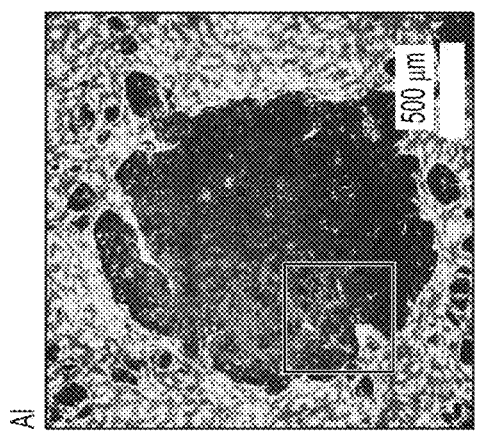
Figure 8C:
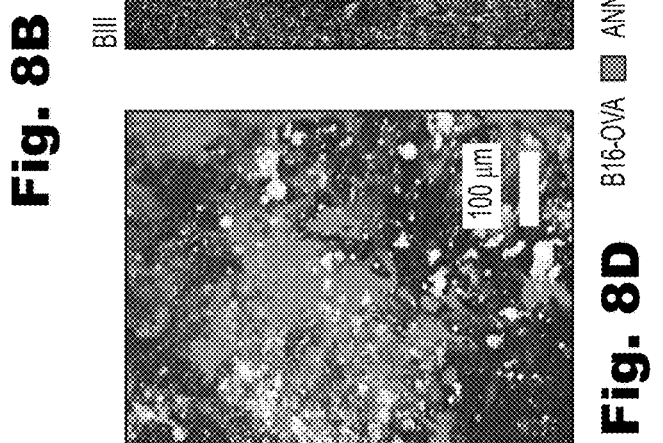
Figure 8D:
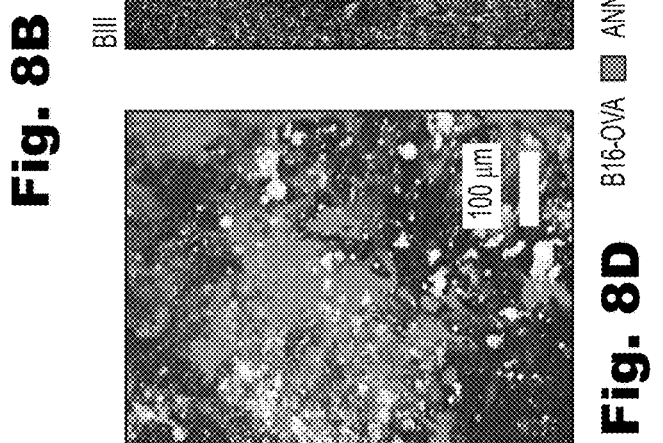
Figure 8E:
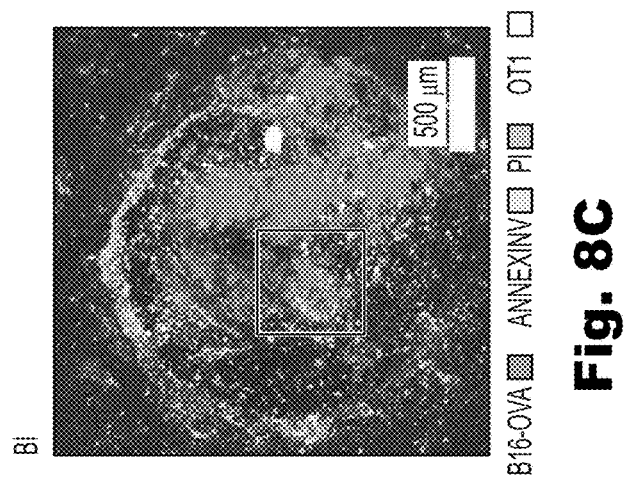

FIG. 7A shows the timeline for the study of interstitial flow and macrophage polarization effects on T-cell recruitment using the device having tumor spheroid embedded in fibrin well. Tumor spheroids do not recruit T-cells before an interstitial flow is applied (FIG. 7B). T-cells are recruited into the spheroid hole in the presence of interstitial flow from the spheroid toward the vasculatures (FIG. 7C). T cell infiltration into the tumor spheroid compartment at day 2 is also observed in FIGS. 8A-8E. FIG. 8A shows T-cell infiltration into the tumor spheroid compartment from the vasculature. FIG. 8B is the zoom of the rectangle area in FIG. 8A. FIG. 8C shows the cytotoxicity of tumor cells caused by infiltrating T-cells in the absence or presence of macrophages. B16 OVA spheroid without macrophages (FIGS. 8C, 8D) display tumor cells killed by specific OT-1 T-cells, shown by Annexin V signal. FIG. 8D is the zoom of the rectangle area in FIG. 8C. If the spheroid does not have macrophages (FIG. 8E), fewer OT-1 T-cells infiltrate to the B16-OVA tumor spheroid and no tumor cell is killed.

Extravasated OT-1 T-cells specifically killed B16-OVA melanoma cells, as characterized by Annexin V apoptosis staining (FIGS. 8C and 8D). When Raw 264.7 macrophages are present in the tumor spheroid co-culture, fewer OT-1 T-cells infiltrate the tumor spheroid, and fewer tumor cell killing events are detected by Annexin V apoptosis staining (FIG. 8F).

Figure 9A:
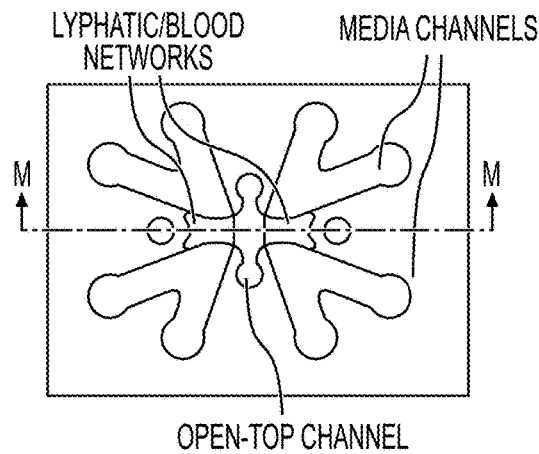
FIGS. 9A, 9B and 9C.
Figure 9B:
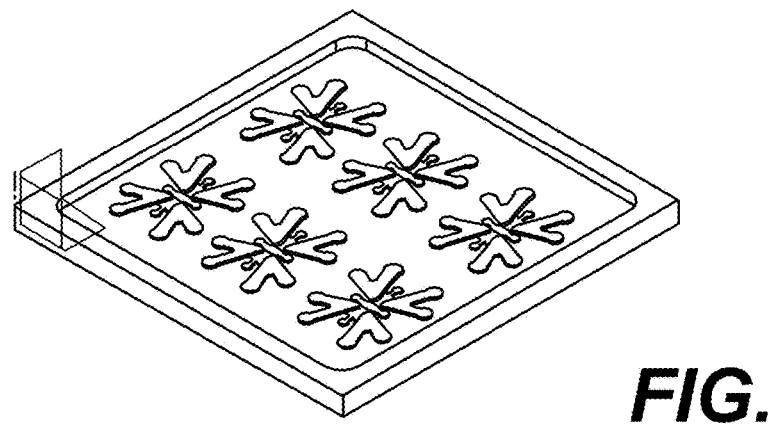
Figure 9C:
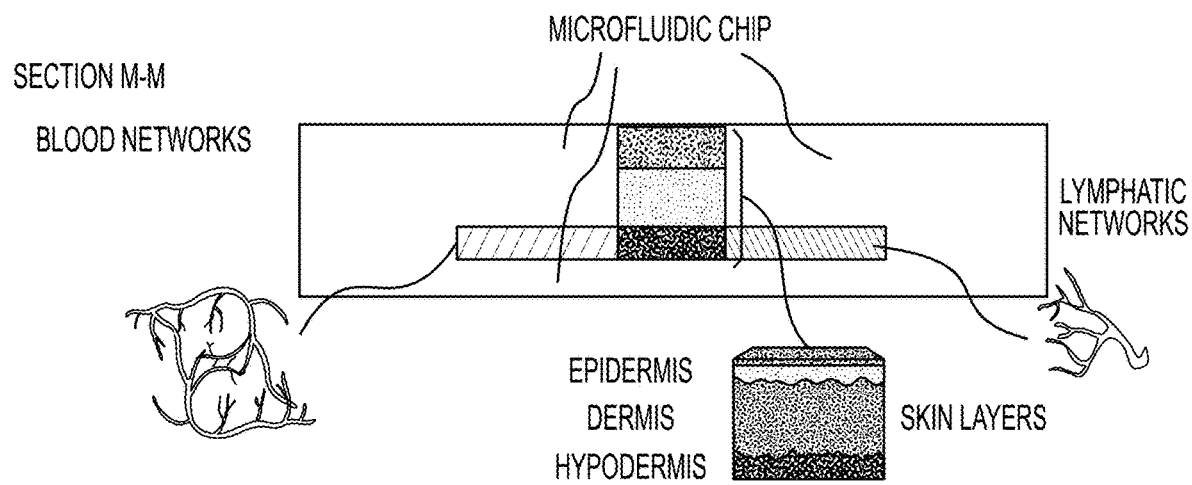

Example 4. Co-Cultures of Blood Endothelial Networks and Lymphatic Endothelial Networks to Create a Model of Vascularized Skin Materials and Methods The design was modified to allow independent circulations of lymphatics and blood endothelial networks within a single device. FIG. 9A is a design of the device with two independent vasculature circuits for blood and lymphatic network co-cultures. The central channel has an open top and is sandwiched between two other gel channels that have either blood or lymphatic vasculatures. The open-top compartment sandwiched by the endothelial and lymphatic compartment receives gel deposition of several layers of skin such as hypodermal layer consisted mainly of adipocytes, the dermal layer consisted mainly of normal human lung fibroblasts, and the epidermal layer consisted of a mix of melanocytes and keratinocytes. All skin layers are suspended in collagen or gelatin-based hydrogel. All three gel channels are flanked by media channels. FIG. 9B is the design of a mold for the fabrication of multiplexed devices. FIG. 9C shows an example of the cross-section M-M when vasculatures are formed and then several layers of skin are deposited into the open-top channel of the device.

Results

The results show that blood endothelial and lymphatic endothelial networks could be produced to create a vascularize tissue model similar to skin. This platform can be used to study drug transportation through the skin to vasculatures and test cosmetics and drugs in cruelty-free laboratories.

Example 5: Vascularized Tumor Model as a Platform for Screening Therapeutic Antibodies Materials and Methods The system of Example 2 was used to form a vascularized tumor model to study the effect of different macrophage phenotypes on monocyte recruitment and screen antibody drugs that block monocyte recruitment by a tumor spheroid. Different vascularized tumor tissue devices are imaged on day 2.

Results

FIGS. 10A-10F and 10G: FIGS. 10A-10F are z-stack images of different devices having vascularized tumor tissue for monocyte migration characterization. From left to right and top to bottom, overlap z-stack images on day 2 of: a control device without a tumor spheroid (only matrix inside the central well, 10A), a device having a 231 TF tumor spheroid (10B), a device containing a 31 TFM tumor spheroid 10C), a device containing a spheroid composed of MDA-MB-468, fibroblast and macrophages co-culture (468 TFM, 10D), a device containing a 231 TFM tumor spheroid treated with drug X (10E) or treated with drug Y (10F). These two drugs are two experimental antibodies that can block monocyte migration. FIG. 10G is a graph of chemotaxis coefficients of monocytes inside the hole compartment in different conditions in the devices shown in FIGS. 10A-10F on day 2 and day 3.

The results show discrepancies of monocyte recruitment response (FIGS. 10A-10F). Devices having 231 TFM tri-culture display the highest monocyte recruitment, as more monocytes are present in the spheroid well, than under other conditions: control device without a tumor spheroid, device having a 231 TF tumor spheroid, spheroid composed of MDA-MB-468, fibroblast and macrophages co-culture (468 TFM), 231 TFM tumor spheroid treated with experimental antibodies that can block monocyte migration.

Chemotaxis coefficients of monocytes inside the hole compartment in different conditions in A on day 2 and day 3 were calculated, as shown in FIG. 10B. Chemotaxis coefficient represents the migration speed of monocytes under a chemoattractant gradient caused by the presence of tumor spheroid. Most monocyte migration happens on day 2 instead of day 3. Moreover, the tumor cell phenotype affects the capability of the tumor spheroid to recruit monocyte. Antibody-drug efficacy can be evaluated by the assessment monocyte chemotaxis coefficient inside the tumor spheroid compartment.

Example 6: Monocyte Recruitment by Ex Vivo Patient Tissues

Methods and Materials

Tumor tissues dissected from a non-small lung cancer patient were fragmented into smaller pieces, before being reconstituted into a medium tissue sample (MTS) of 0.032±0.011 mg and a large tissue sample (LTS) of 0.2±0.048 mg. Patient tissues were inserted into the open-top well, monocytes are perfused into the devices and the device was imaged daily.

Results

FIGS. 11A-11F and 11G: FIGS. 11A-11F display two devices that have two tissue fragments of different weights, which are obtained from the same non-small lung cancer patient ex vivo tumoral tissues. Tumor tissues are fragmented into smaller pieces, before being reconstituted into a medium tissue sample (MTS) of 0.032±0.011 mg (FIGS. 11A, 11C, 11E) and large tissue sample (LTS) of 0.2±0.048 mg (FIGS. 11B, 11D, 11F). Perfused monocytes are recruited by the ex vivo tissue, proved by a strong presence of monocytes inside the central hole compartment at day 2.

Devices with ex vivo tissues recruit monocytes from vasculatures significantly higher than a control device (FIG. 11A). Chemotaxis coefficients of monocytes within the central hole compartment, showed that monocytes migrate faster into the central hole in the presence of ex vivo tissues (FIG. 11G) compared to a control device with only a fibrin/collagen matrix in the center well without a tissue sample.

Example 7: An Angiogenesis Assay

Methods and Materials

A 231 TF spheroid was added into the device using two different media for the tumor spheroid and vasculature. The 231 spheroid was fed with RPMI with 10% FBS and the vasculature was flanked in Vasculife with 2% FBS. This gradient of FBS helped new vessels form and sprout into the tumor spheroids.

Results

FIGS. 12A-12B: Example of an angiogenesis assay. Image of a device with a 231 TF spheroid on day 1 (FIG. 12A) and day 4 (FIG. 12B). New microvasculature vessels sprouting into the tumor spheroid by angiogenesis from the existing vasculatures were observed.

New vessels sprout into the tumor spheroid from the existing vasculatures by angiogenesis.

Example 8: Measure Molecular and Nanoparticle Permeability of the Vascular Networks Materials and Methods Fluorescent molecules and nanoparticles were perfused into the vascular networks. Time-lapse imaging was used to record the diffusion of these molecules and nanoparticles. This was used to compute the permeability of the vascular networks in the presence of an MDA-MB-468 tumor-fibroblast-macrophage tri-culture (468TFM) spheroid.

Results

Higher vascular permeability of 10 kDa Dextran (FIG. 13A) and 200 nm nanoparticle (FIG. 13B) was found in the presence of a 467 TFM spheroid inside the central hole.

Example 9: Freezing and Thawing Devices for Transportation

Materials and Methods

To freeze devices for long-distance transportation, media inside a vascular network device was replaced with a commercial freezing media and the device placed inside a thermal insulation box at 4° C. for 1 to 4 hours before transferring the box to a −80° C. freezer overnight. The device can be transferred to a liquid nitrogen tank or placed into dried ice. On the day of use, the device is thawed at 37° C. and media perfused to revive cells inside the device.

Results

Several days after thawing, cells inside the vascular network devices were still alive and functional.

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will recognize, or be able to ascertain using no more than routine experimentation, equivalents to the specific embodiments of the invention described herein. Such equivalents are intended to be encompassed by the following claims.

We claim:

1. A microfluidic device for forming perfusable tissue masses with infiltrates, the microfluidic device comprising:
  a) adjacent and parallel microchannels comprising
    at least one central microchannel as a gel channel and
    at least two microchannels as media channels,
    wherein the gel channel is sandwiched between the media channels,
    wherein the gel channel comprises a first end and a second end and is separated from the media channels by phase guides; and
  b) at least one open-top port positioned in a top surface of the gel channel and at a distance away from the first end and the second end;
    wherein the gel channel comprises a perfusable microvascular network having an interconnected network of channels lined by endothelial cells that are surrounded by a gel, wherein the gel comprises at least one cavity in the gel for implanting an extracellular matrix and one or more cells, spheroids, organoids, or mixes of cells therein, wherein the interconnected network of channels of the perfusable microvascular network surround the at least one cavity and allow for extravasation of cellular components from a cell culture media flowed therein to the one or more cells, spheroids, organoids, or mixes of cells therein, wherein the at least one cavity is positioned below the at least one open-top port.

2. The microfluidic device of claim 1, wherein the at least one open-top port has a diameter between about 0.5 to 2 mm.

3. The microfluidic device of claim 1, wherein the gel channel and the media channels have a height of about 200-500 μm.

4. The microfluidic device of claim 3, wherein the gel channel has a length measured from the first end to the second end between about 10 mm and 50 mm.

5. The microfluidic device of claim 1, wherein the at least one open-top port is positioned at about a center of the gel channel.

6. The microfluidic device of claim 1, wherein the at least one open-top port is positioned at a distance between about 1 mm and about 20 mm away from the first end and the second end of the gel channel.

7. The microfluidic device of claim 1, wherein each open-top port includes a removable spacer.

8. The microfluidic device of claim 1, wherein the first end and the second end of the gel channel are open ends.

9. The microfluidic device of claim 1 further comprising fluidic connections to generate flows of a cell culture media through the interconnected network of channels in the gel inside the gel channel.

10. The microfluidic device of claim 1 wherein the interconnected network of channels are microvessels of about 5-100 μm in diameter and 50-200 μm in length, and wherein a monolayer of the endothelial cells coats the channels of the interconnected network, wherein the gel in the gel channel further comprises extracellular matrix (ECM) components.

11. The microfluidic device of claim 10, wherein the microvascular network further comprises cells selected from the group consisting of stromal cells, smooth muscle cells, pericytes, fibroblasts, progenitor cells, astrocytes, adipocytes, neural cells, stem cells and combinations thereof.

12. The microfluidic device of claim 10, wherein the extracellular matrix components are selected from the group consisting of collagen, fibrin, fibronectin, elastins, laminin, hyaluronic acid; vitronectin, D-lysine, proteoglycans, and combinations thereof.

13. The microfluidic device of claim 1, further comprising media for freezing cells.

14. The microfluidic device of claim 1, wherein the cellular components comprise immune cells isolated from blood selected from the group consisting of T-cells, monocytes, natural killer cells, neutrophils, B-cells, and cell lines thereof.

15. A microfluidic platform comprising a plurality of microfluidic devices of claim 1.

16. The microfluidic device of claim 15 further comprising fluidic connections contacting the at least one open-top port and/or at least one of the media channels.

17. The microfluidic platform of claim 16 wherein the at least one open-top port positioned over the at least one cavity of each microfluidic device is connected to a fluidic pipeline to generate a fluid flow and horizontally through the gel channel.

18. The microfluidic platform of claim 17 wherein the fluid flow flows vertically and horizontally through the gel channel of each microfluidic device and towards at least one of the media channels of each microfluidic device.

19. The microfluidic device of claim 18, wherein the fluid flow comprises interstitial and luminal flows.

20. The microfluidic platform of claim 17 wherein the fluid flow has a flow rate between 0.001 and 10 μl/s.

21. A method of forming perfusable tissue masses optionally with cellular infiltrates in the microfluidic device of claim 1, comprising the steps of:
   i) depositing one or more cells, spheroids, organoids, or mixes of cells into the at least one cavity; and
   ii) flowing a cell culture media within the perfusable microvascular network to extravasate cellular components in the cell culture media to the one or more cells, spheroids, organoids, or mixes of cells.

22. The method of claim 21, wherein the one or more cells, spheroids, organoids, or mixes of cells are in a supporting extracellular matrix.

23. The method of claim 21, wherein at least one of the media channels comprises additional cells for infiltrating the perfused one or more cells, spheroids, organoids, or mixes of cells.

24. The method of claim 21 further comprising culturing the one or more cells, spheroids, organoids, or mixes of cells in the microfluidic device for a period between about 2 and 10 days.

25. A method of freezing the microfluidic device of claim 13 comprising placing the microfluidic device at 4° C. for 1 to 4 hours then at −80° C. for 8-12 hours.

26. The method of claim 25, further comprising thawing the microfluidic device at 37° C. and perfusing it with media to revive the cells inside the microfluidic device.

* * * * *